United States Patent
Bao et al.

(10) Patent No.: US 9,537,668 B2
(45) Date of Patent: Jan. 3, 2017

(54) LTE EMBMS SERVICE ENHANCEMENT

(71) Applicant: QUALCOMM Incorporated, San Diego, CA (US)

(72) Inventors: Gang Bao, San Diego, CA (US); Jun Wang, Poway, CA (US); Xiaoxia Zhang, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 14/524,959

(22) Filed: Oct. 27, 2014

(65) Prior Publication Data

US 2015/0180676 A1      Jun. 25, 2015

Related U.S. Application Data

(60) Provisional application No. 61/919,537, filed on Dec. 20, 2013.

(51) Int. Cl.
*H04L 12/18*    (2006.01)
*H04W 28/02*   (2009.01)
(Continued)

(52) U.S. Cl.
CPC ......... *H04L 12/1886* (2013.01); *H04L 12/189* (2013.01); *H04W 28/0236* (2013.01);
(Continued)

(58) Field of Classification Search
CPC .............. H04L 12/1886; H04L 12/189; H04W 28/0236; H04W 28/0278; H04W 28/085; H04W 72/005; H04W 28/0263; H04W 28/16; H04W 72/0433; H04W 72/08; H04W 84/12; H04W 24/08; H04W 24/10

See application file for complete search history.

(56) References Cited

U.S. PATENT DOCUMENTS

| | | | | |
|---|---|---|---|---|
| 2008/0274759 | A1* | 11/2008 | Chen ................... | H04W 72/005 455/507 |
| 2011/0021224 | A1* | 1/2011 | Koskinen ............ | H04W 72/005 455/507 |

(Continued)

FOREIGN PATENT DOCUMENTS

SE    WO 2014111309 A1 *  7/2014  ........ H04W 72/1215

OTHER PUBLICATIONS

Broadcom Corporation et al: "On LTE in Unlicensed Spectrum", 3GPP Draft; RP-132008, 3rd Generation Partnership Project (3GPP), Mobile Competence Centre ; 650, Route Des Lucioles ; F-06921 Sophia-Antipolis Cedex; France vol. TSG RAN, No. Busan, Korea; 20131203-20131206 Dec. 4, 2013 (Dec. 4, 2013), XP050734461, Retrieved from the Internet: URL:http://www.3gpp.org/ftp/Meetings_3GPP_SYNC/RAN/RAN/Docs/ [retrieved on Dec. 4, 2013] the whole document.

(Continued)

*Primary Examiner* — Yee Lam
(74) *Attorney, Agent, or Firm* — Arent Fox LLP

(57) ABSTRACT

A method, an apparatus, and a computer program product for wireless communication are provided. The apparatus may be an MCE. The apparatus receives a plurality of channel status reports from respective eNBs. In an aspect, each channel status report includes channel information associated with a respective eNB for one of a plurality of channels in a contention based radio frequency band. The apparatus selects a channel for an eNB among the plurality of channels based on the plurality of channel status reports. In an aspect, the selected channel is available to be used for (Continued)

an eMBMS. The apparatus prompts the eNB to provide the eMBMS using the selected channel.

20 Claims, 20 Drawing Sheets

(51) Int. Cl.
| | |
|---|---|
| *H04W 28/16* | (2009.01) |
| *H04W 72/04* | (2009.01) |
| *H04W 28/08* | (2009.01) |
| *H04W 72/00* | (2009.01) |
| *H04W 84/12* | (2009.01) |
| *H04W 72/08* | (2009.01) |

(52) U.S. Cl.
CPC ... *H04W 28/0263* (2013.01); *H04W 28/0278* (2013.01); *H04W 28/16* (2013.01); *H04W 72/04* (2013.01); *H04W 28/085* (2013.01); *H04W 72/005* (2013.01); *H04W 72/0433* (2013.01); *H04W 72/08* (2013.01); *H04W 84/12* (2013.01)

(56) References Cited

U.S. PATENT DOCUMENTS

| | | | | |
|---|---|---|---|---|
| 2011/0222493 A1* | 9/2011 | Mangold | ............... | H04B 1/0475 370/329 |
| 2011/0243056 A1* | 10/2011 | Jen | ..................... | H04L 5/0007 370/312 |
| 2013/0246631 A1 | 9/2013 | Gonzales et al. | | |
| 2013/0294356 A1 | 11/2013 | Bala et al. | | |
| 2015/0296411 A1* | 10/2015 | Meyer | ................. | G08G 1/0112 370/336 |
| 2015/0327297 A1* | 11/2015 | Nilsson | ............. | H04W 72/1215 370/336 |

OTHER PUBLICATIONS

International Search Report and Written Opinion—PCT/US2014/062679—ISA/EPO—Feb. 23, 2015.

"Introducing LTE in Unlicensed Spectrum", 3GPP Draft; RP-131635 LTE in Unlicensed Spectrum, 3rd Generation Partnership Project (3GPP), Mobile Competence Centre ; 650, Route Des Lucioles ; F-06921 Sophia-Antipolis Cedex ; France No. Busan, South Korea; 20131203-20131207 Dec. 2, 2013 (Dec. 2, 2013), XP050733706, Retrieved from the Internet: URL:http://www.3gpp.org/ftp/Meetings_3GPP_SYNC/RAN/RAN/Docs/ [retrieved on Dec. 2, 2013] the whole document.

Rahman M I, et al., "License-exempt LTE systems for secondary spectrum usage: Scenarios and first assessment", IEEE International Symposium on New Frontiers in Dynamic Spectrum Access Networks ; (Aachen) : May 3-6, 2011 Dyspan; (Aachen) : May 3-6, 2011 IEEE International Symposium on Dynamic Spectrum Access Networks ; (Aachen) : May 3-6, 2011, Piscataway, NJ, May 3, 2011 (May 3, 2011), pp. 349-358, XP031953894, DOI: 10.1109/DYSPAN.2011.5936224 ISBN: 978-1-4577-0177-1.

* cited by examiner

LTE EMBMS SERVICE ENHANCEMENT

CROSS-REFERENCE TO RELATED APPLICATION(S)

This application claims the benefit of U.S. Provisional Application Ser. No. 61/919,537, entitled "LTE EMBMS SERVICE ENHANCEMENT" and filed on Dec. 20, 2013, which is expressly incorporated by reference herein in its entirety.

BACKGROUND

Field

The present disclosure relates generally to communication systems, and more particularly, to an evolved Multimedia Broadcast Multicast Service.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a multicast coordination entity (MCE). The apparatus receives a plurality of channel status reports from respective eNodeBs (eNBs). In an aspect, each channel status report includes channel information associated with a respective eNB for one of a plurality of channels in a contention based radio frequency band. The apparatus selects a channel for an eNB among the plurality of channels based on the plurality of channel status reports. In an aspect, the selected channel is available to be used for an evolved multimedia broadcast multicast service (eMBMS). The apparatus prompts the eNB to provide the eMBMS using the selected channel.

In another aspect, the apparatus may include an MCE. The apparatus includes a memory and at least one processor coupled to the memory. The at least one processor is configured to receive a plurality of channel status reports from respective eNBs, where each channel status report includes channel information associated with a respective eNB for one of a plurality of channels in a contention based radio frequency band, select a channel for an eNB among the plurality of channels based on the plurality of channel status reports, where the selected channel is available to be used for an eMBMS, and prompt the eNB to provide the eMBMS using the selected channel.

In another aspect, the apparatus may include an MCE. The apparatus includes means for receiving a plurality of channel status reports from respective eNBs, where each channel status report includes channel information associated with a respective eNB for one of a plurality of channels in a contention based radio frequency band. The apparatus includes means for selecting a channel for an eNB among the plurality of channels based on the plurality of channel status reports, where the selected channel is available to be used for an eMBMS. The apparatus includes means for prompting the eNB to provide the eMBMS using the selected channel.

In another aspect, a computer program product may be provided for an MCE. The computer program product includes a computer-readable medium including code for receiving, by an MCE, a plurality of channel status reports from respective eNBs, where each channel status report includes channel information associated with a respective eNB for one of a plurality of channels in a contention based radio frequency band, selecting a channel for an eNB among the plurality of channels based on the plurality of channel status reports, where the selected channel is available to be used for an eMBMS, and prompting the eNB to provide the eMBMS using the selected channel.

In another aspect of the disclosure, a method, a computer program product, and an apparatus are provided. The apparatus may be an MCE. The apparatus determines whether content to be communicated using an eMBMS includes a delay quality of service (QoS) requirement. In an aspect, the eMBMS is communicated within a channel in a contention based radio frequency band. The apparatus prompts an eNB to communicate the content during a contention-free portion of a frame of the channel upon determining that the content includes the delay QoS requirement. In an aspect, the channel is organized based on a time division multiplexing (TDM) scheme in which the frame includes the contention-free portion and a contention portion of the frame. The apparatus prompts the eNB to communicate the content during the contention portion of the frame upon determining that the content does not include the delay QoS requirement.

In another aspect, the apparatus may include an MCE. The apparatus includes a memory and at least one processor coupled to the memory. The at least one processor is configured to receive a plurality of channel status reports from respective eNBs, where each channel status report includes channel information associated with a respective eNB for one of a plurality of channels in a contention based radio frequency band, select a channel for an eNB among the plurality of channels based on the plurality of channel status reports, where the selected channel is available to be used for an eMBMS, and prompt the eNB to provide the eMBMS using the selected channel.

In another aspect, the apparatus may include an MCE. The apparatus includes means for determining whether content to be communicated using an eMBMS includes a delay QoS requirement, where the eMBMS is communicated within a channel in a contention based radio frequency band. The apparatus includes means for prompting an eNB to communicate the content during a contention-free portion of a frame of the channel upon determining that the content includes the delay QoS requirement, where the channel is organized based on a TDM scheme in which the frame includes the contention-free portion and a contention portion of the frame. The apparatus includes means for prompting the eNB to communicate the content during the contention portion of the frame upon determining that the content does not include the delay QoS requirement.

In another aspect, a computer program product may be provided for an MCE. The computer program product includes a computer-readable medium including code for determining, by an MCE, whether content to be communicated using an eMBMS includes a delay QoS requirement, where the eMBMS is communicated within a channel in a contention based radio frequency band, prompting an eNB to communicate the content during a contention-free portion of a frame of the channel upon determining that the content includes the delay QoS requirement, where the channel is organized based on a TDM scheme in which the frame includes the contention-free portion and a contention portion of the frame, and prompting the eNB to communicate the content during the contention portion of the frame upon determining that the content does not include the delay QoS requirement.

DETAILED DESCRIPTION

Figure 1:
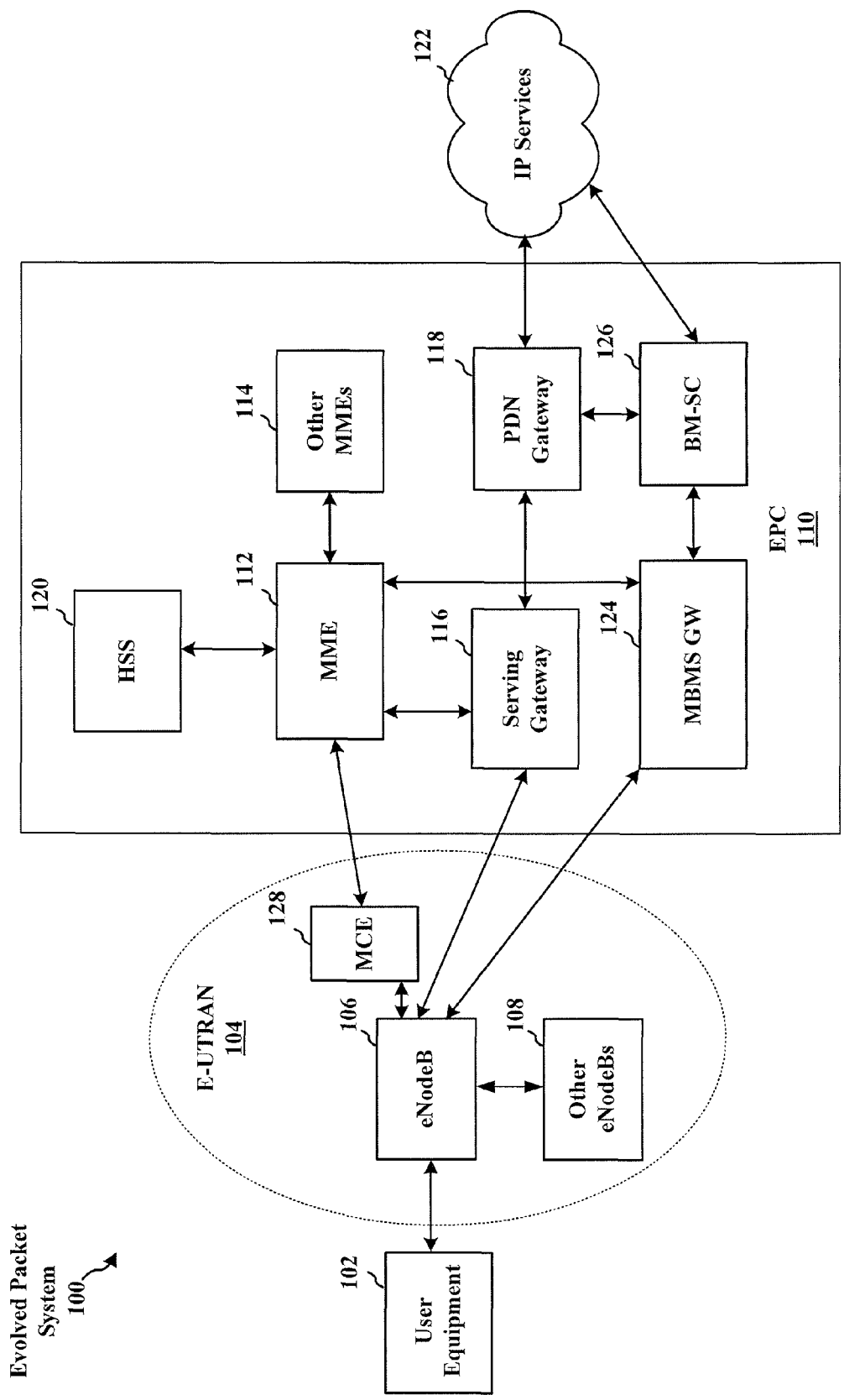
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
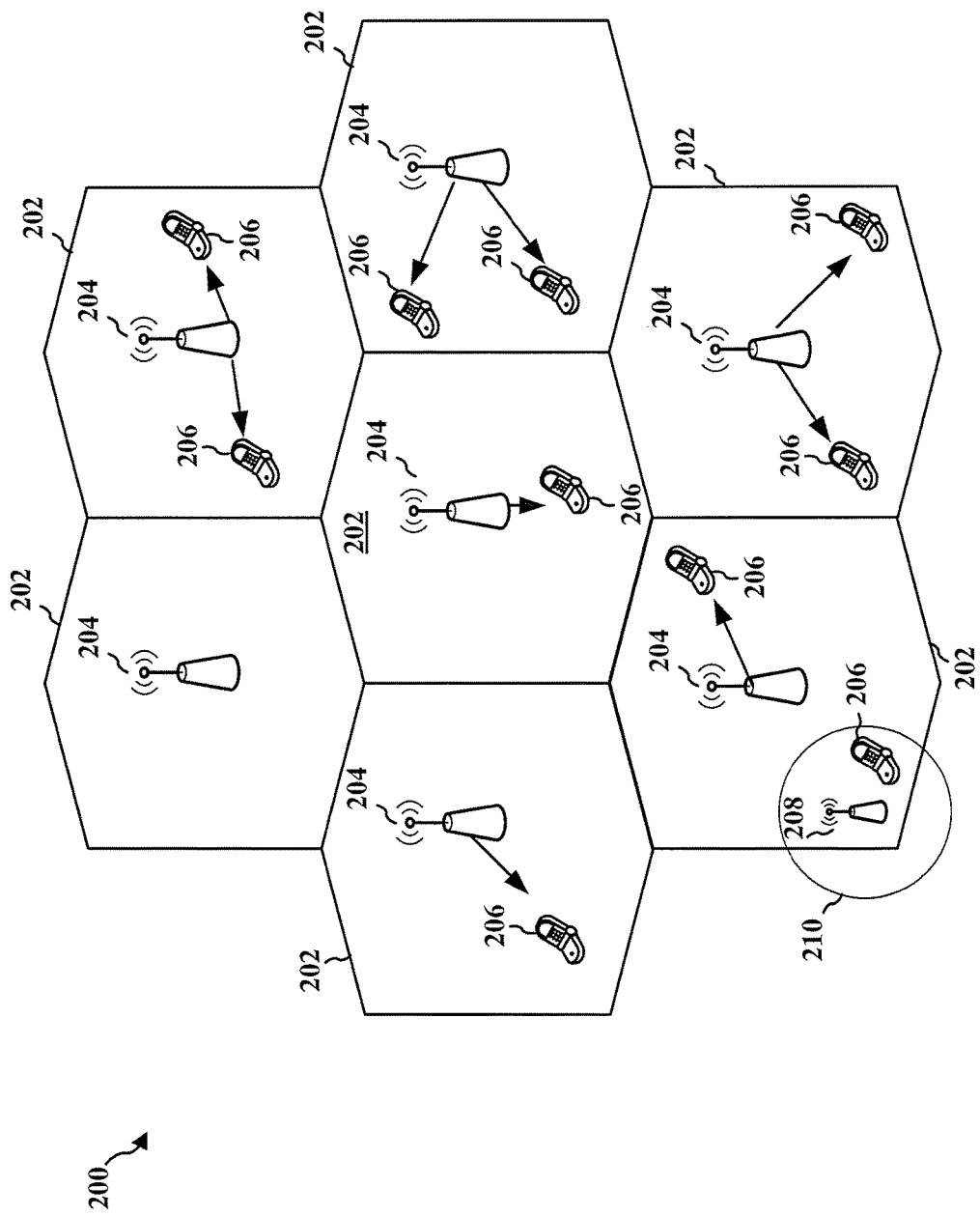
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
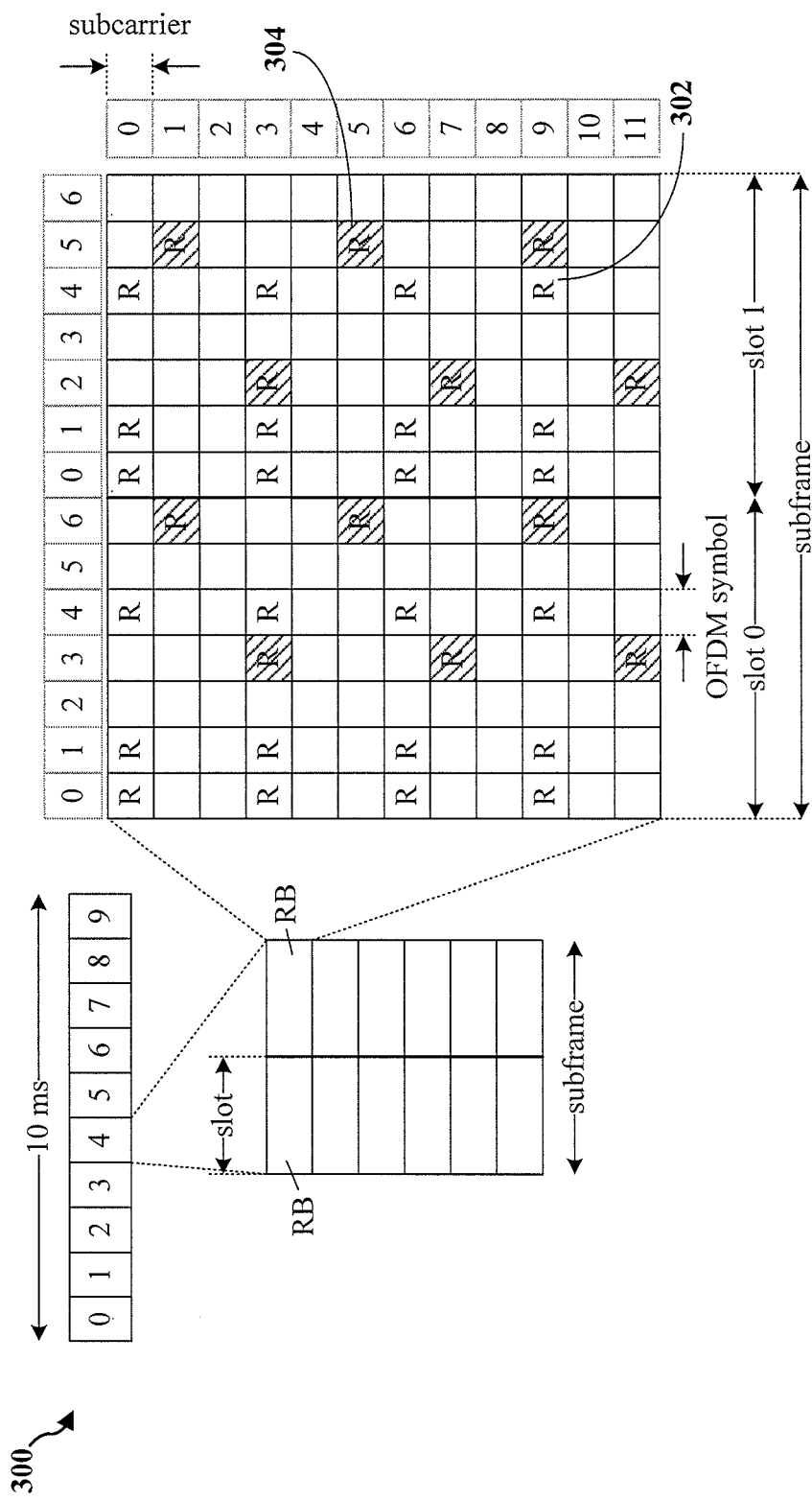
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource block may contain 6 consecutive OFDM symbols in the time domain, or 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
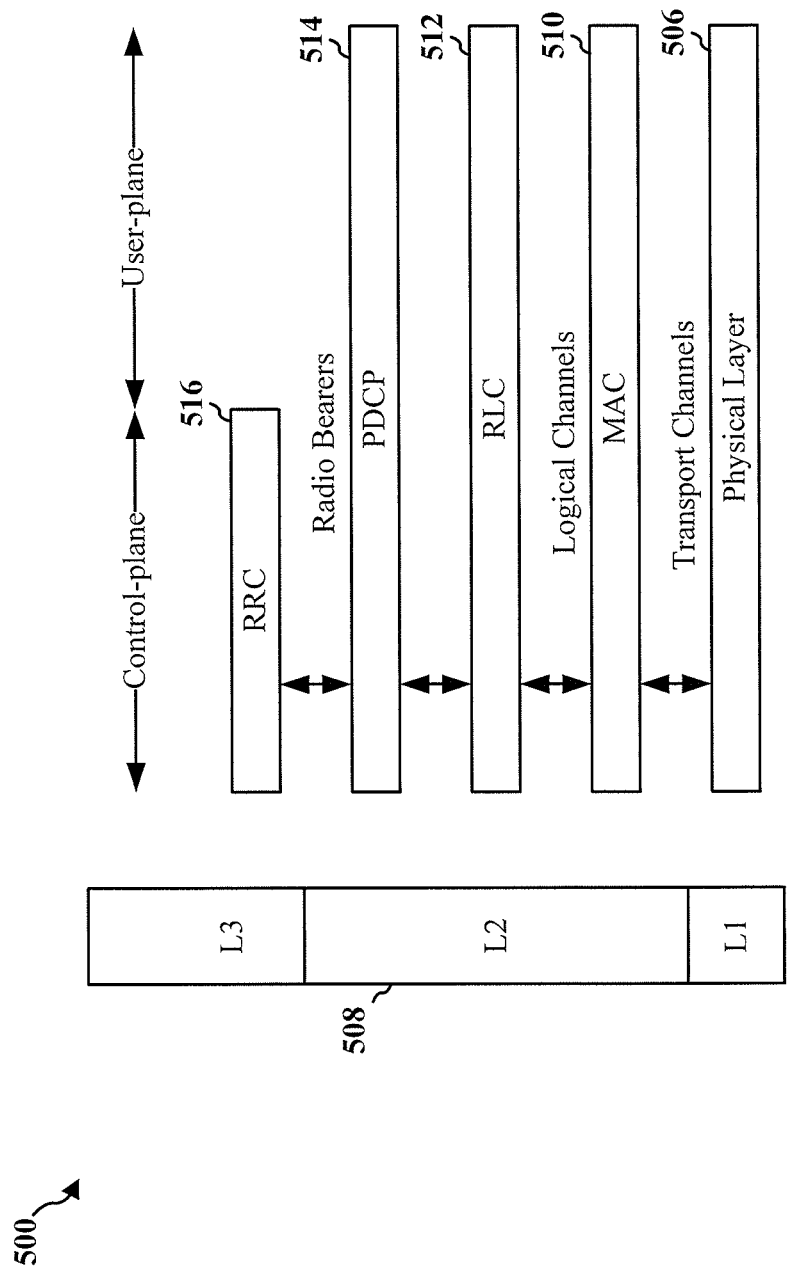
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
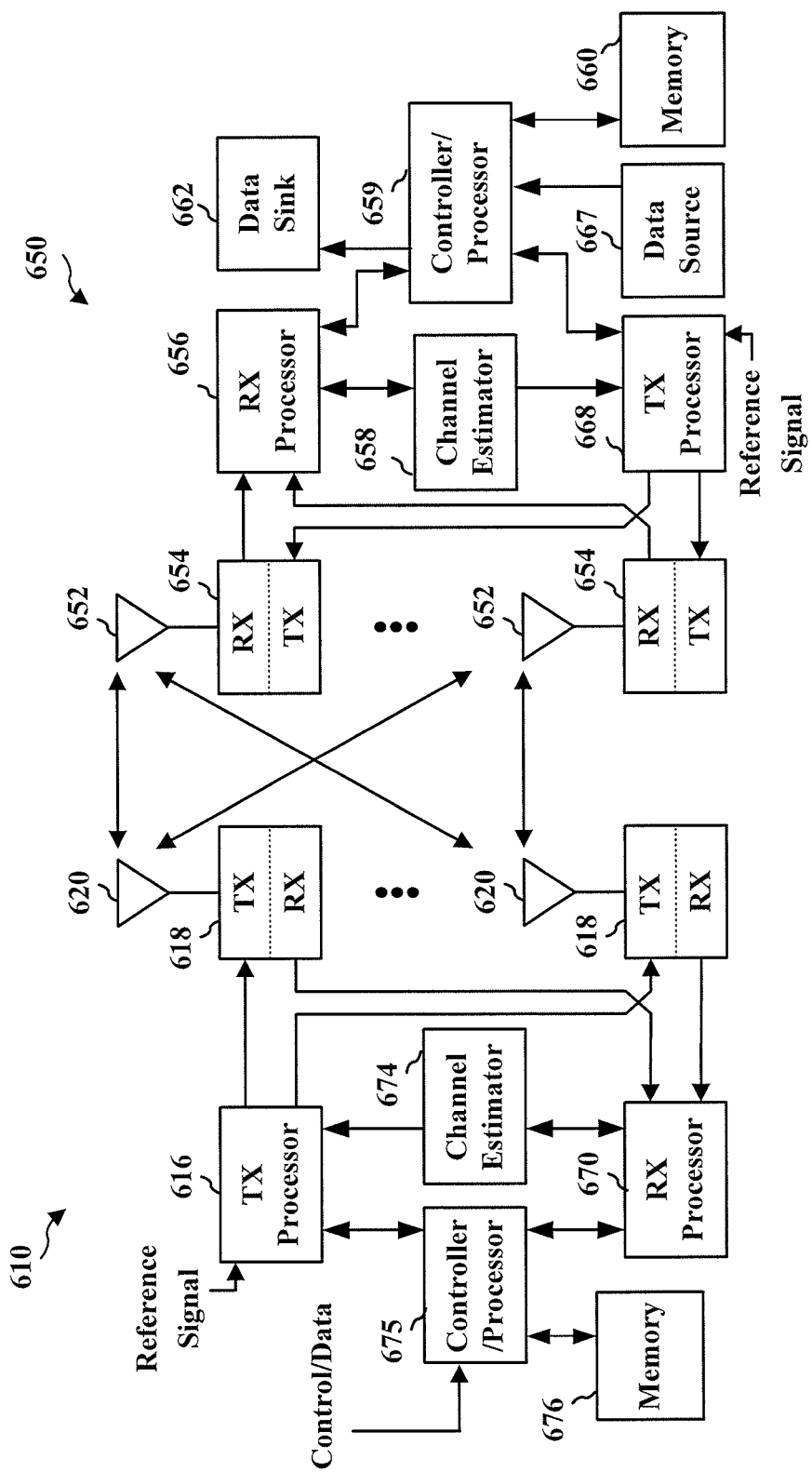
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
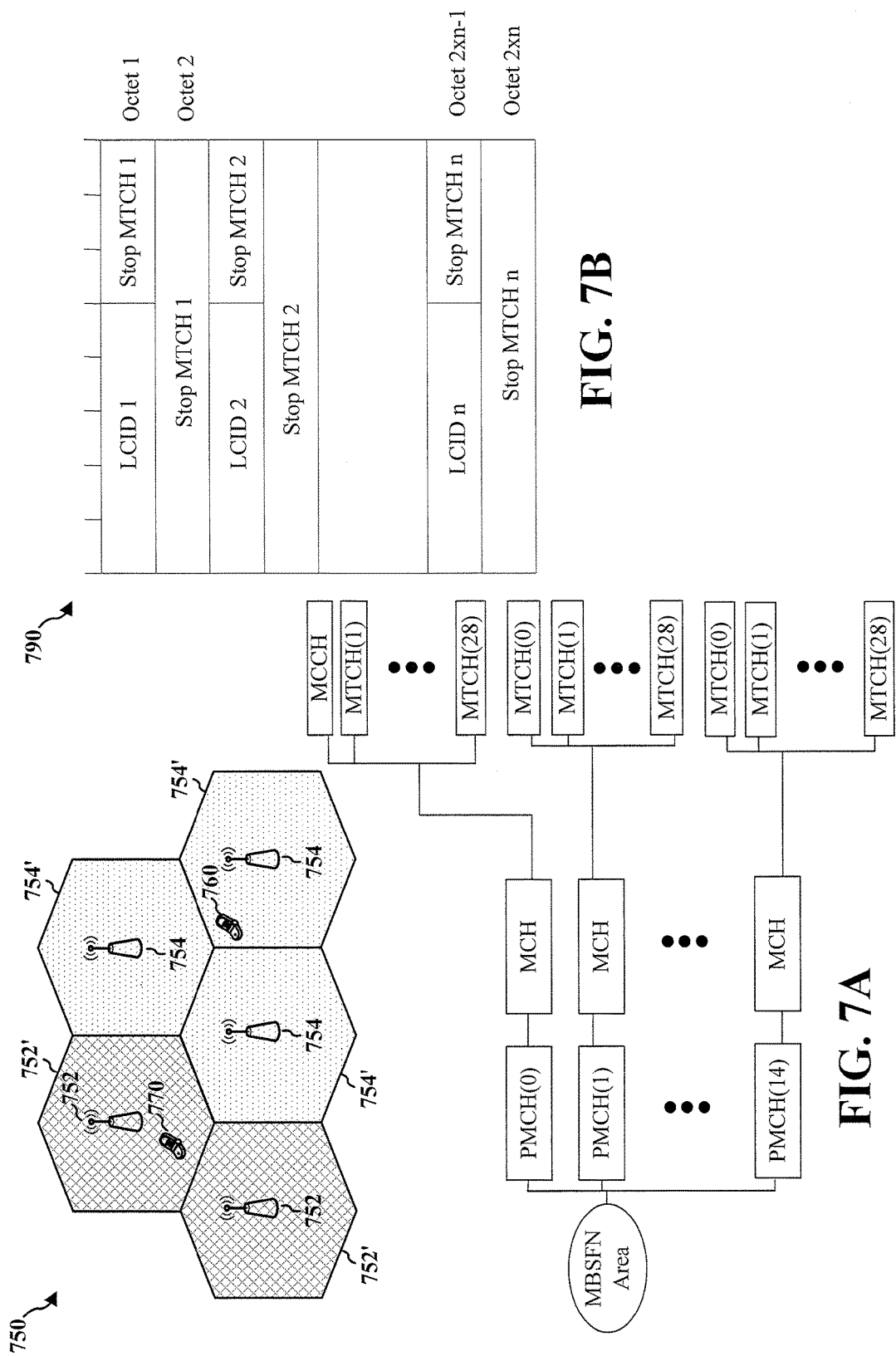
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 may indicate (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

An eNB utilizing an unlicensed spectrum performs channel selection independently of other eNBs. Thus, different eNBs may select different channels. The channel selection by the eNBs may affect MBSFN transmission. In channel selection, an air interface may or may not change, and network interfaces may change or may be under proprietary implementation. In providing an eMBMS, Wi-Fi (e.g., a WLAN) cannot provide single frequency network (SFN) broadcast services. However, an eNB utilizing the unlicensed spectrum may provide SFN broadcast services for the eMBMS service. For example, an eNB utilizing the unlicensed spectrum may be used to provide the SFN broadcast services in a venue such as a concert hall or a stadium, or for a hot-spot use.

In a macro cell eMBMS, to improve coverage, the eNB utilizing the unlicensed spectrum may be used for weak coverage areas of a macro cell eMBMS service. A capacity of the macro cell eMBMS is limited by the weak coverage areas. Thus, the eNB utilizing the unlicensed spectrum to provide weak coverage area service may increase the macro cell eMBMS coverage and capacity. Further, to improve a coverage boundary of a macro cell eMBMS, a UE at a macro cell eMBMS coverage boundary may rely on unicast/broadcast switching to maintain service continuity. However, a data rate may be low in a unicast channel, and utilizing the unicast may generate undesired loading.

A coverage boundary of a macro cell eMBMS may be improved by using an eNB utilizing an unlicensed spectrum to maintain service continuity across MBSFN areas. In the approach with the eNB utilizing the unlicensed spectrum, several factors are considered to improve eMBMS experience. First, the eMBMS communication via the eNB utilizing the unlicensed spectrum should not create interference to existing Wi-fi services in the same spectrum. Second, the eNB utilizing the unlicensed spectrum should provide maximum coverage of the service area. Third, the eNB utilizing the unlicensed spectrum should achieve maximum SFN gain, with coverage areas connected together. Fourth, the eMBMS service via the eNB utilizing the unlicensed spectrum should minimize blocking of Wi-fi services because blocking of the Wi-fi services in the frequency spectrum is undesirable. For example, the eMBMS service via the eNB utilizing the unlicensed spectrum may occupy one spectrum for an extended period of time, therefore blocking a Wi-fi service in the spectrum occupied by the eNB. The above factors are addressed infra more in detail.

eNBs utilizing the unlicensed spectrum scan all channels and periodically report a status to an MCE. The status may include information about whether each channel is free or busy as well as a loading history. Similar to Wi-fi, a frequency is divided into multiple channels (e.g., 5 GHz divided into 12 channels), such that the eNB utilizing the unlicensed spectrum may utilize the multiple channels. The MCE may have information on eNB topology (e.g., a location of the eNB) through a configuration. If the MCE does not have information on eNB topology, the eNB may report the location of the eNB to the MCE. Thus, the MCE may gather reports from multiple eNBs, and then select based on the reports the most desirable channel for each of the eNBs to provide the eMBMS service. The most desirable channel for the eMBMS service may be a free channel having no Wi-fi service or a low-load channel having low load of the Wi-fi service. Upon channel selection, the MCE sends channel selection information on the selected channel to each of the eNBs, and may prompt the eNBs to change the channels based on the channel selection information. The MCE may reselect a channel periodically to reduce quality of service (QoS) impact toward a Wi-fi service, thereby minimizing blocking of the Wi-fi service.

In each selection or reselection of a channel, the MCE maximizes continuous eMBMS coverage at the channel to increase SFN gain. In a first aspect, the MCE may use multiple channels to maintain coverage of an entire service area. It is noted that a single channel may not be sufficient to provide coverage for an entire service area, especially if there is Wi-fi interference in several spots in the service area. In a second aspect, eNBs may use a time division multiplex (TDM) mode in general and a point coordination function (PCF) mode in particular to create periodical contention-free eMBMS transmission slots to maintain continuous coverage in one channel, where the contention-free eMBMS transmission slots are free of Wi-fi interference. For example, one period of time may be contention-based and another period of time may be contention-free. The MCE sends channel selection information to the UE, such that the UE may realize how to incorporate changes that were made at the eNB. The MCE may send the channel selection information to the UE on a primary component carrier (PCC) (e.g., via existing SIB15).

According to the first aspect, channel switching for an eMBMS is performed based on coordination with multiple eNBs utilizing an unlicensed spectrum. In a first approach of the first aspect, each eNB utilizing the unlicensed spectrum detects signal strength of a Wi-fi service in order to detect interference by the Wi-fi service. For example, each eNB may detect the interference by the Wi-fi service by detecting a received signal strength indicator (RSSI) of a Wi-fi beacon or an RSSI of a response (e.g., a probe response) by a Wi-fi station. Each eNB utilizing the unlicensed spectrum reports to an MCE a transmission intention of a Wi-fi station as well as a channel status report. The channel status report from each eNB includes information on whether a channel with the eNB is free or busy. The channel status report may indicate that the channel is busy if the signal strength of the Wi-fi service in the channel is greater than a first threshold (e.g., signal strength threshold), and that the channel is free if the signal strength of the Wi-fi service in the channel is less than or equal to the first threshold.

Based on the channel status reports from multiple eNBs utilizing the unlicensed spectrum, the MCE selects a free channel for each of the multiple eNBs to provide the largest possible continuous coverage and then directs each of the eNBs to switch to the corresponding free channel. If the MCE determines that a free channel is not available, the MCE directs each eNB to switch to a low-load channel. If the MCE determines that a number of free channels is less than a number of eNBs, the MCE may direct some eNBs to switch to the free channels while directing the remaining eNBs to switch to low-load channels. The MCE may determine that a channel is a low-load channel if a minimum Wi-fi beacon RSSI or a minimum Wi-fi response RSSI is less than a second threshold (e.g., a load threshold). As such, the MCE directs each of the multiple eNBs to occupy a free channel or a low-load channel, such that an eNB is placed in every free or low-load spot in order to maximize coverage. Thus, the MCE coordinates with the multiple eNBs to direct channel switching by the eNBs for maximizing coverage. However, if neither a free channel nor a low-load channel exists, then the MCE may direct the UE to receive the eMBMS data via an eNB utilizing a licensed spectrum or via unicast channels. After the MCE selects the channel (e.g., a free channel or a low-load channel) for each eNB, the MCE directs the UE via a PCC to reselect an eMBMS channel of the UE to correspond with the channel selected by the MCE. For example, each time the MCE selects an eMBMS channel, the MCE may direct the UE via a PCC to reselect a channel of the UE to the selected eMBMS channel.

A second approach of the first aspect utilizes multiple channels to maximize coverage. If the eNB utilizing the unlicensed spectrum uses a common channel (e.g., a single channel) to communicate eMBMS, interference from a Wi-fi station at the same channel is likely to cause a coverage hole. Thus, multiple channels may be utilized to maintain eMBMS service continuity. In particular, the MCE selects a channel for the eMBMS service for each of multiple eNBs based on channel status reports from the multiple eNBs. The MCE may be configured to select channels for each eNB site so that a total number of channels used for the eMBMS is minimized and the number of consecutive eMBMS sites at each channel is maximized, in order to maximize SFN gain. For example, consecutive eMBMS sites are neighboring eMBMS sites. The MCE may implement carrier aggregation at the UE to allow for one service spanning multiple channels. In particular, if multiple channels may be used for a single eNB, the MCE may direct the UE to perform carrier aggregation to combine signals (e.g., eMBMS signals) from multiple channels, in order to maximize coverage. The signals sent to the multiple channels may be synchronized to facilitate the carrier aggregation by the UE. It is noted that a single channel may not be able to provide sufficient MBSFN gain. The air interface may be changed to implement the carrier aggregation.

As discussed supra, each of the multiple eNBs utilizing the unlicensed spectrum regularly reports its respective channel status report to the MCE, to indicate whether the channel is free or busy. Based on the channel status reports from the multiple eNBs, the MCE selects a serving channel for each eNB cell, so that a maximum number of areas are covered by the eMBMS and maximum continuous coverage area is achieved at each channel. For example, if there are free channels based on the channel status reports and the eNBs are not utilizing the free channels, the MCE may prompt the eNBs to reselect to the free channels to maximize coverage for the eMBMS.

Figure 8:
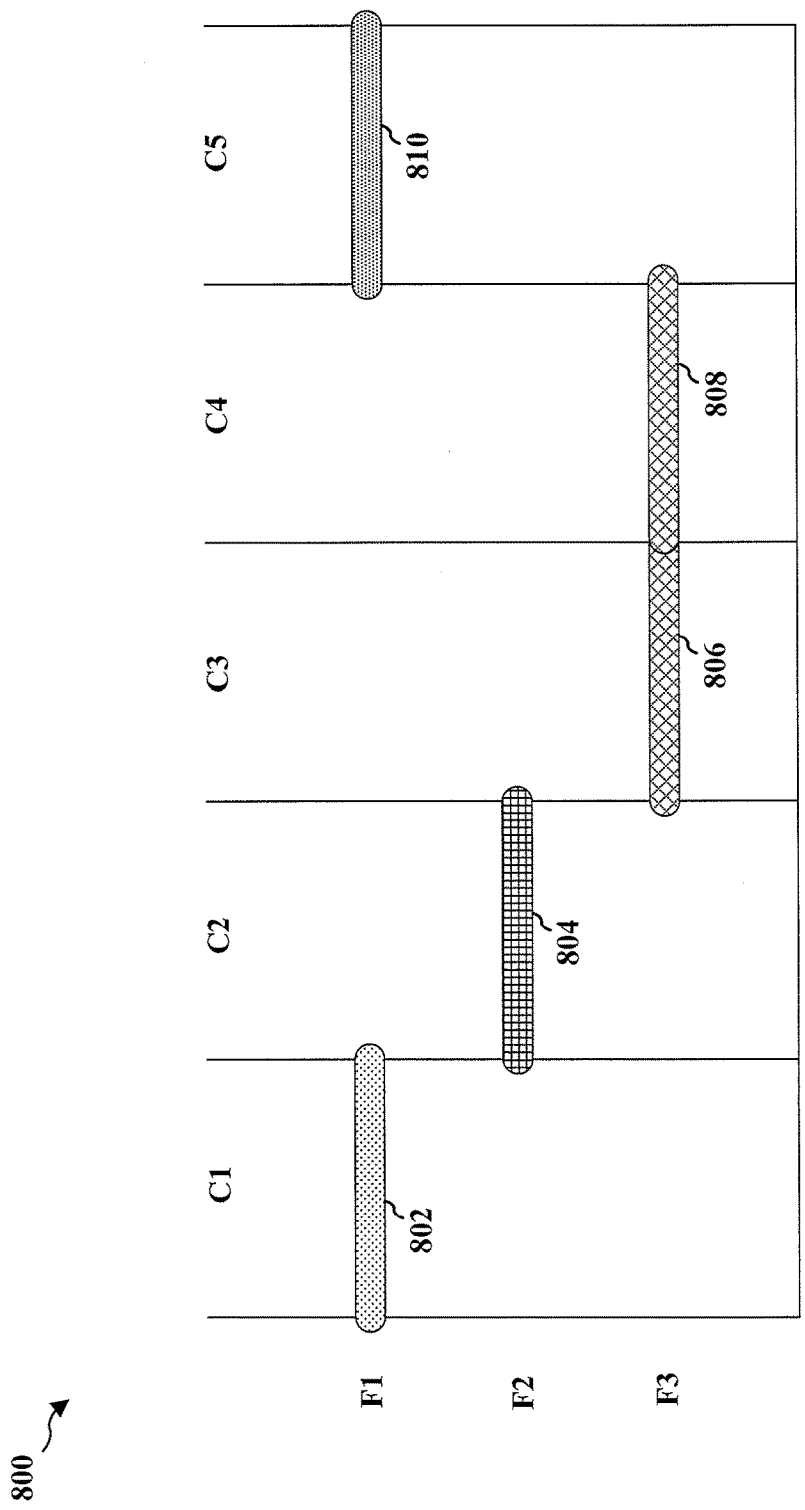
FIG. 8 is an example diagram illustrating channel selections for eNB cells according to an approach of a first aspect.

FIG. 8 is an example diagram 800 illustrating channel selections for eNB cells according to the second approach of the first aspect. According to FIG. 8, a first eNB channel selection 802 indicates that for a first eNB cell C1, a channel with frequency F1 is selected. A second eNB channel selection 804 indicates that a channel with frequency F2 is selected for a second eNB cell C2. A third eNB channel selection 806 and a fourth eNB channel selection 808 indicate that a channel with frequency F3 is selected for a third eNB cell C3 and a fourth eNB cell C4. The third eNB cell C3 and the fourth eNB cell C4 represent two consecutive sites (e.g., two neighboring sites) for eMBMS utilizing the same channel. With the consecutive eMBMS sites, the third eNB cell C3 and the fourth eNB cell 4 may provide an improved SFN gain and maximum coverage. A fifth eNB channel selection 810 indicates that a channel with frequency F1 is selected for a fifth eNB cell C5.

Figure 9:
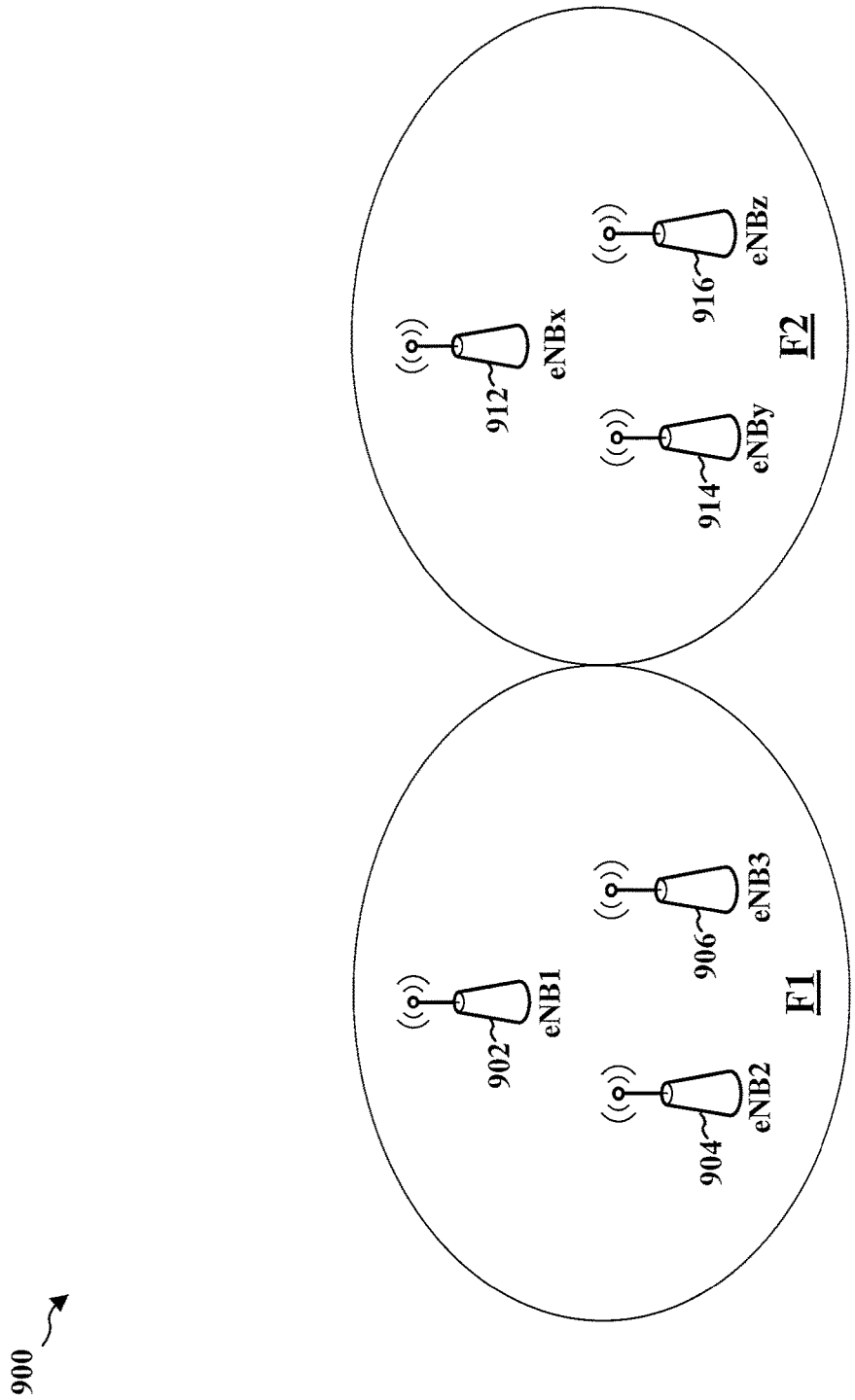
FIG. 9 is an example diagram illustrating eNBs in two groups utilizing different frequencies.

FIG. 9 is an example diagram 900 illustrating eNBs in two groups utilizing different frequencies. The eNBs utilizing the unlicensed spectrum may be grouped together to achieve improved SFN gain. A first group of eNBs including eNB1 902, eNB2 904, and eNB3 906 utilizes frequency F1, and a second group of eNBs including eNBx 912, eNBy 914, and eNBz 916 utilizes frequency F2. For example, if the MCE cannot find a free channel that can accommodate all of the eNBs in the area (e.g., eNB1 902, eNB2 904, eNB3 906, eNBx 912, eNBy 914, and eNBz 916), the MCE may decide that one group of eNBs (e.g., eNB1 902, eNB2 904, and eNB3 906) will transmit eMBMS on one free channel corresponding to one frequency (e.g., F1) and may decide that another group of eNBs (e.g., eNBx 912, eNBy 914, and eNBz 916) will transmit eMBMS on another free channel corresponding to another frequency (e.g., F2). In FIG. 9, eNB1 902, eNB2 904, and eNB3 906 provide services for three respective cells on frequency F1 that are neighboring with one another as consecutive cells. Thus, eNB1 902, eNB2 904, and eNB3 906 are grouped together to form consecutive cells in frequency F1, resulting in improved SFN gain and maximum coverage. eNBx 912, eNBy 914, and eNBz 916 provide services for three respective cells on frequency F2 that are neighboring with one another as consecutive cells. Thus, eNBx 912, eNBy 914, and eNBz 916 are grouped together to form consecutive cells in frequency F1, resulting in improved SFN gain and maximum coverage may be provided. If eNB2 904 cannot transmit on F1 (e.g., due to Wi-Fi interference), the MCE may cause eNB2 904 to mute eMBMS subframes. During the muting period (e.g., while the eMBMS subframes are muted), the eNB2 904 will drop eMBMS packets, but eNB1 902 and eNB3 906 will still send eMBMS packets. Thus, the UE may maintain a desired SFN gain via eNB1 902 and eNB3 906, even when eNB2 904 is muted. As discussed supra, the grouping of eNBs may be based on a frequency utilized by the eNBs. The grouping of eNBs 902, 904, and 906 and the grouping of eNBs 912, 914, and 916 may further be based on respective geographic locations (e.g., eNB topology) of eNBs 902, 904, 906, 912, 914, and 916.

A third approach of the first aspect addresses Wi-fi QoS issues. An eNB utilizing the unlicensed spectrum may have an undesirable impact on the Wi-fi service. Because the eNB utilizing the unlicensed spectrum operates independently of the Wi-fi service, the eNB utilizing the unlicensed spectrum and the Wi-fi service do not share a same channel at the same time. Thus, for example, a Wi-fi station may refrain from providing the Wi-fi service at a channel having a strong eMBMS signal from the eNB utilizing the unlicensed spectrum. As a result, the eNB utilizing the unlicensed spectrum may stay in one channel long enough to have an undesirable effect on the QoS of the Wi-fi service in the same channel.

According to the third approach, the MCE may utilize a multi-channel feature to allow each eNB periodically hop among free channels, instead of staying in one channel for an extended period of time. The eNBs utilizing the unlicensed spectrum send their respective channel status reports to the MCE to indicate whether the respective channels are free or busy. Based on the channel status reports from the eNBs, the MCE selects channels for the eMBMS. The MCE refrains from selecting channels that are heavily loaded by the Wi-fi service, and selects channels that are free from the Wi-fi service or have a low load of the Wi-fi service. For each eNB utilizing the unlicensed spectrum, the MCE periodically reselects a free channel or a low-load channel for the eMBMS, and causes the eNB to change the channel to the reselected channel. For each eNB site, the MCE periodically reselects a free channel in a predefined pattern, a round-robin pattern or a random pattern, so as to have each eNB perform eMBMS service hopping among free channels and/or low load channels. For example, if there are three free channels, the MCE may periodically reselect a channel among the three free channels such that the eNB hops among the three free channels periodically instead of staying at one free channel. By periodically reselecting a channel, the undesirable effect on the QoS of the Wi-fi service due to the eNB staying in the same channel for an extended period of time may be reduced or eliminated.

Figure 10:
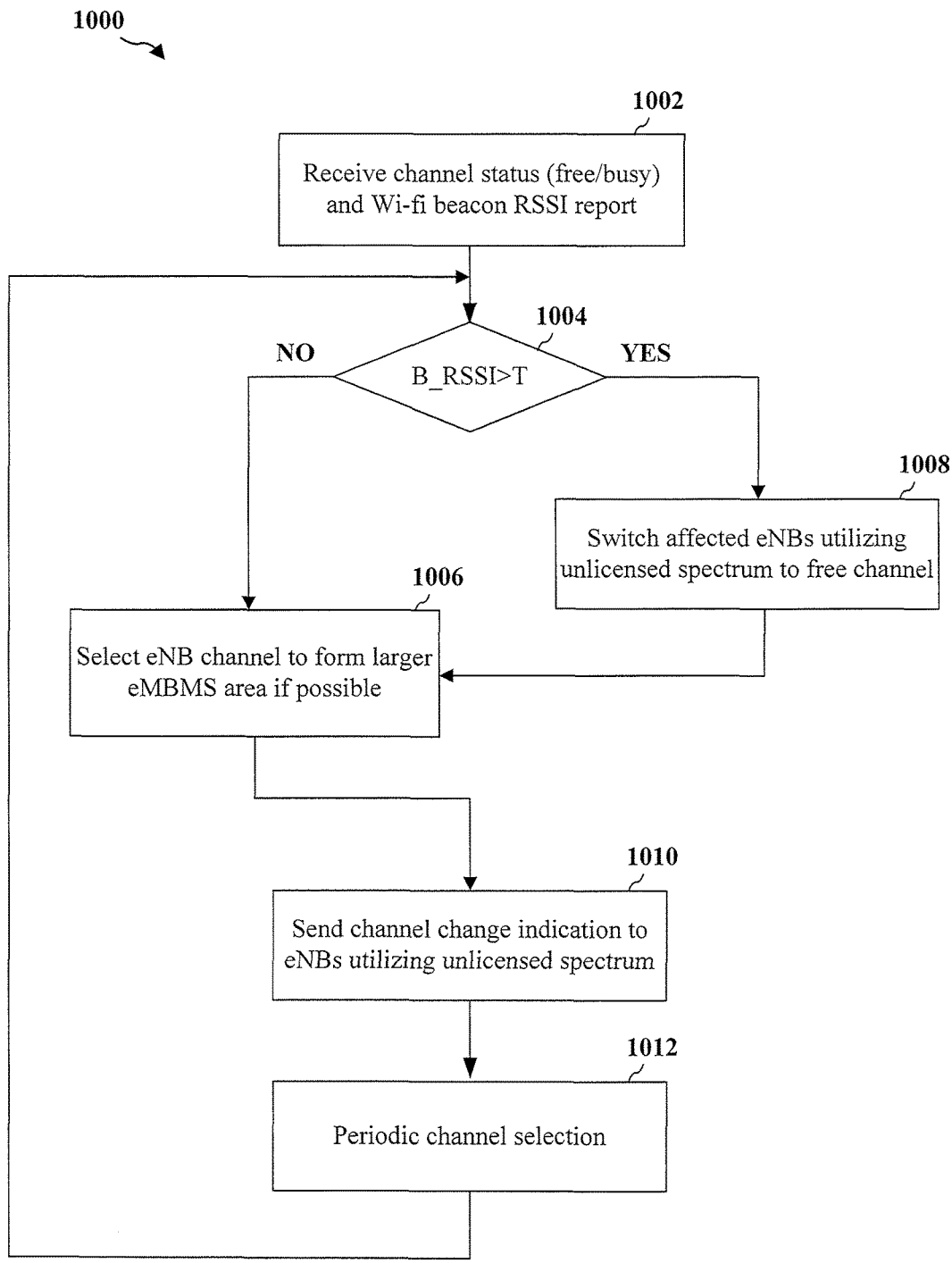
FIG. 10 is an example flow chart illustrating an approach of the first aspect performed at an MCE.

FIG. 10 is an example flow chart 1000 illustrating the third approach of the first aspect performed at an MCE. At 1002, the MCE receives a channel status report from each eNB and also receives a Wi-fi beacon RSSI report. The channel status report includes information regarding whether a corresponding channel is free or busy or low-load. The Wi-fi beacon RSSI report includes information regarding the RSSI of the Wi-fi service. At 1004, for each eNB, the MCE determines whether the Wi-fi beacon RSSI (B_RSSI) at a channel utilized by the respective eNB is greater than a threshold T, based on the channel status report and the Wi-fi beacon RSSI report. If the Wi-fi beacon RSSI for a current channel is not greater than the threshold T, the MCE selects at 1006 the current channel or another free or low-load channel for each eNB in order to maximize an eMBMS coverage area. If the Wi-fi beacon RSSI is greater than the threshold T, the MCE prompts the eNB(s) with a current channel having a Wi-fi beacon high RSSI to switch at 1008 out of the current channel with a Wi-fi beacon high RSSI to a free channel, and then selects at 1006 a new free channel (or a new low-load channel) for each eNB in order to maximize an eMBMS coverage area. After selecting the channel for each eNB at 1006, the MCE sends at 1010 a channel change indication to the eNBs utilizing unlicensed spectrum. At 1012, the MCE performs channel selection periodically to allow each eNB to perform eMBMS service hopping among free channels. After performing the periodic channel selections, the MCE may return to 1004.

Figure 11:
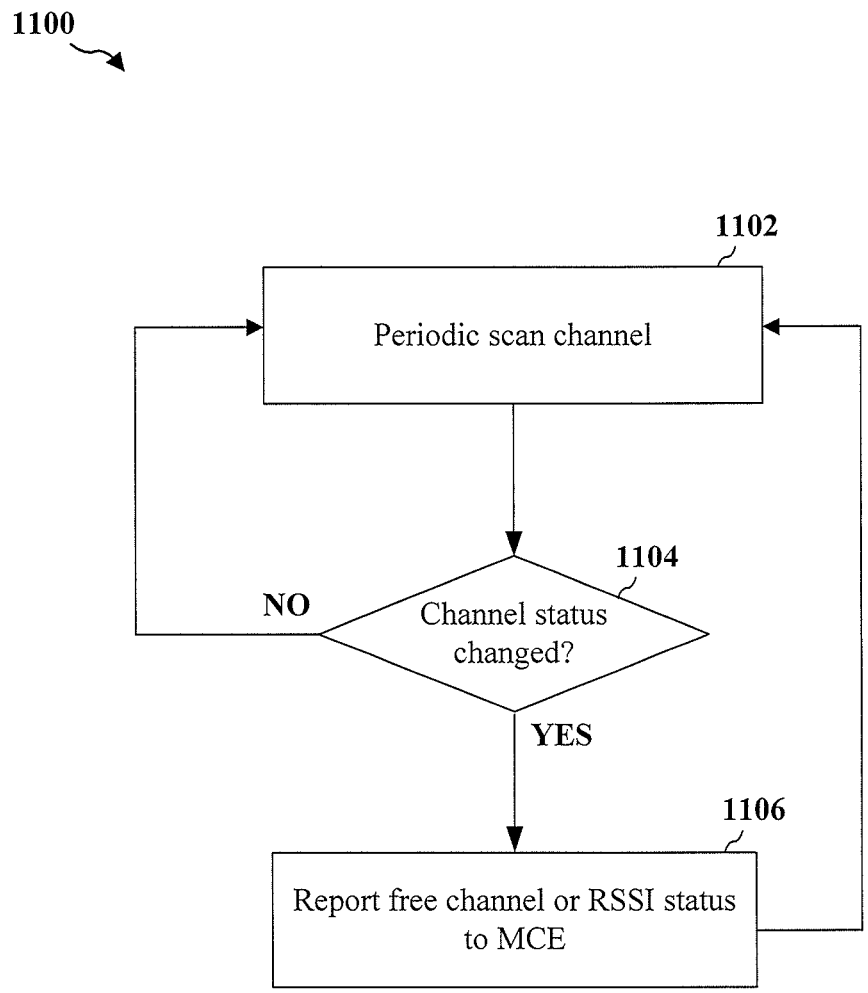
FIG. 11 is an example flow chart illustrating an approach of the first aspect performed at an eNB utilizing an unlicensed spectrum.

FIG. 11 is an example flow chart 1100 illustrating the third approach of the first aspect performed at an eNB utilizing an unlicensed spectrum. At 1102, the eNB periodically scans a channel utilized by the eNB. At 1104, the eNB determines whether a channel status has changed based on the periodic scan of the channel. If there is a change in the channel status, the eNB reports at 1106 a free channel or the RSSI status to the MCE. After reporting a free channel or the RSSI status to the MCE, the eNB may return to 1102. If the eNB determines at 1104 that there is no change in the channel status, the MCE returns to 1102.

A second aspect utilizes a contention-free TDM mode to facilitate co-existence of an eNB service utilizing an unlicensed spectrum and a Wi-fi service and to maintain maximum coverage. The TDM mode may periodically provide a contention-free period and a contention period. The eNB service utilizing the unlicensed spectrum and the Wi-fi service may compete for a time period to communicate data. According to a first approach of the second aspect, the MCE may prompt the eNB utilizing the unlicensed spectrum to send delay-sensitive data during the contention-free period, and to send data that is not delay-sensitive during the contention period. Thus, if the MCE determines that the eMBMS data is delay-sensitive, the MCE prompts the eNB to send the delay-sensitive eMBMS data in periodical contention-free periods to satisfy the delay QoS requirement. On the other hand, the MCE prompts the eNB to send non-delay-sensitive eMBMS data and Wi-fi data in periodical contention periods.

Figure 12:
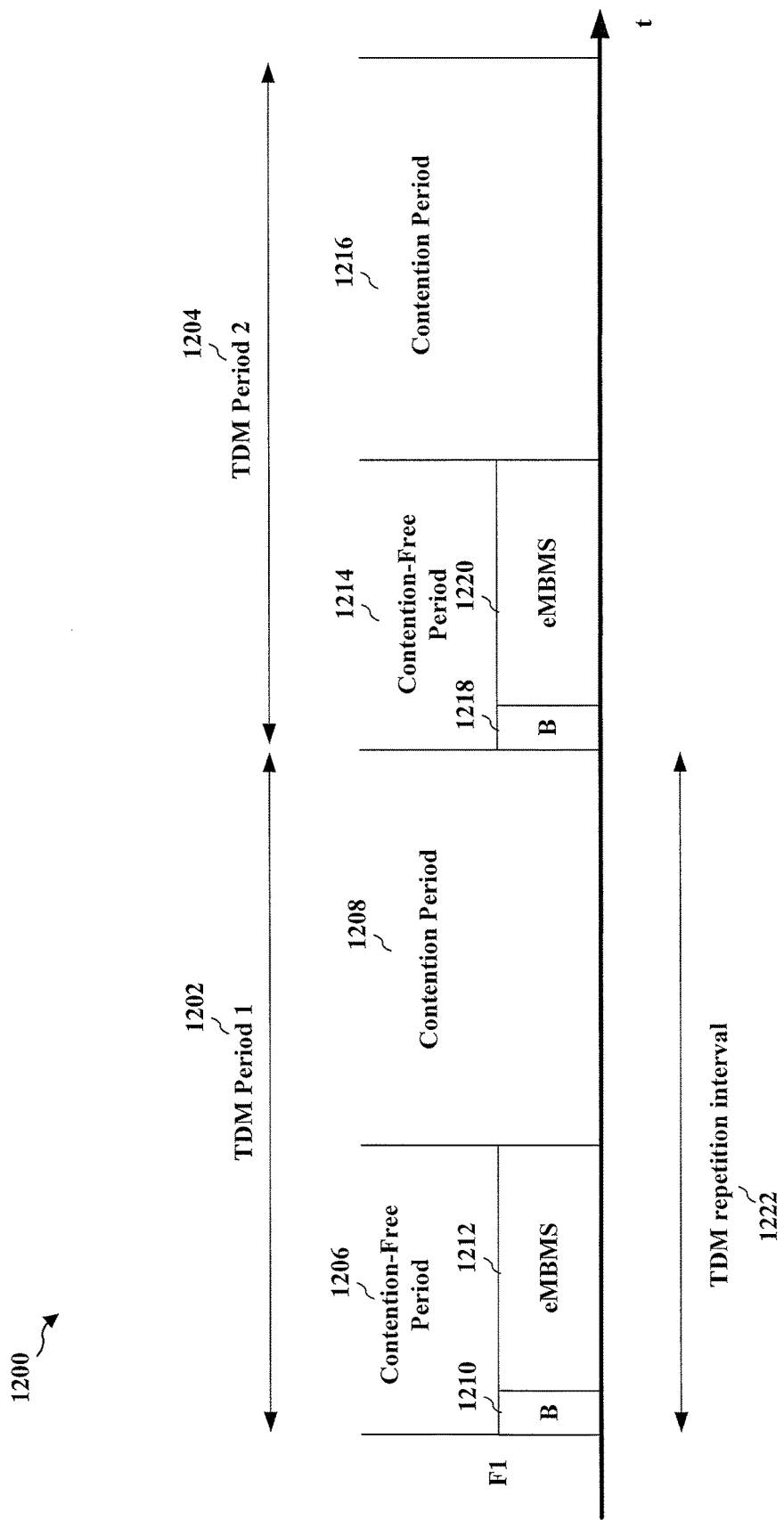
FIG. 12 is an example time diagram of TDM periods including contention-free periods and contention periods according to an approach of a second aspect.

FIG. 12 is an example time diagram 1200 of TDM periods including contention-free periods and contention periods according to the first approach of the second aspect. The example time diagram 1200 illustrates two TDM periods for a channel corresponding to frequency F1, where the two TDM periods include TDM Period 1 1202 and TDM Period 2 1204. It is noted that there may be more TDM periods before and/or after the two TDM periods shown. TDM Period 1 1202 includes a contention-free period 1206 and a contention period 1208. During the contention-free period 1206, the MCE prompts an eNB utilizing the unlicensed spectrum to send a beacon signal 1210 and eMBMS data 1212 that are delay-sensitive. During the contention period 1208, the MCE prompts an eNB utilizing the unlicensed spectrum to send eMBMS data and/or Wi-fi data that are not delay-sensitive. TDM period 2 1204 includes a contention-free period 1214 and a contention period 1216. It is noted that the TDM periods may be repeated over time based on the TDM repetition interval. For example, each TDM period may be repeated as indicated by the TDM repetition interval 1222. Therefore, TDM Period 2 1204 may be a repeat of TDM Period 1 1202, and thus the contention-free period 1214 and the contention period 1216 of TDM Period 2 may be the same as or similar to the contention-free period 1206 and contention period 1208 of TDM Period 1 1202, respectively. Thus, during the contention-free period 1214, the MCE prompts an eNB utilizing the unlicensed spectrum to send a beacon signal 1218 and eMBMS data 1220 that are delay-sensitive. During the contention period 1216, the MCE prompts an eNB utilizing the unlicensed spectrum to send eMBMS data and/or Wi-fi data that are not delay-sensitive.

Figure 13:
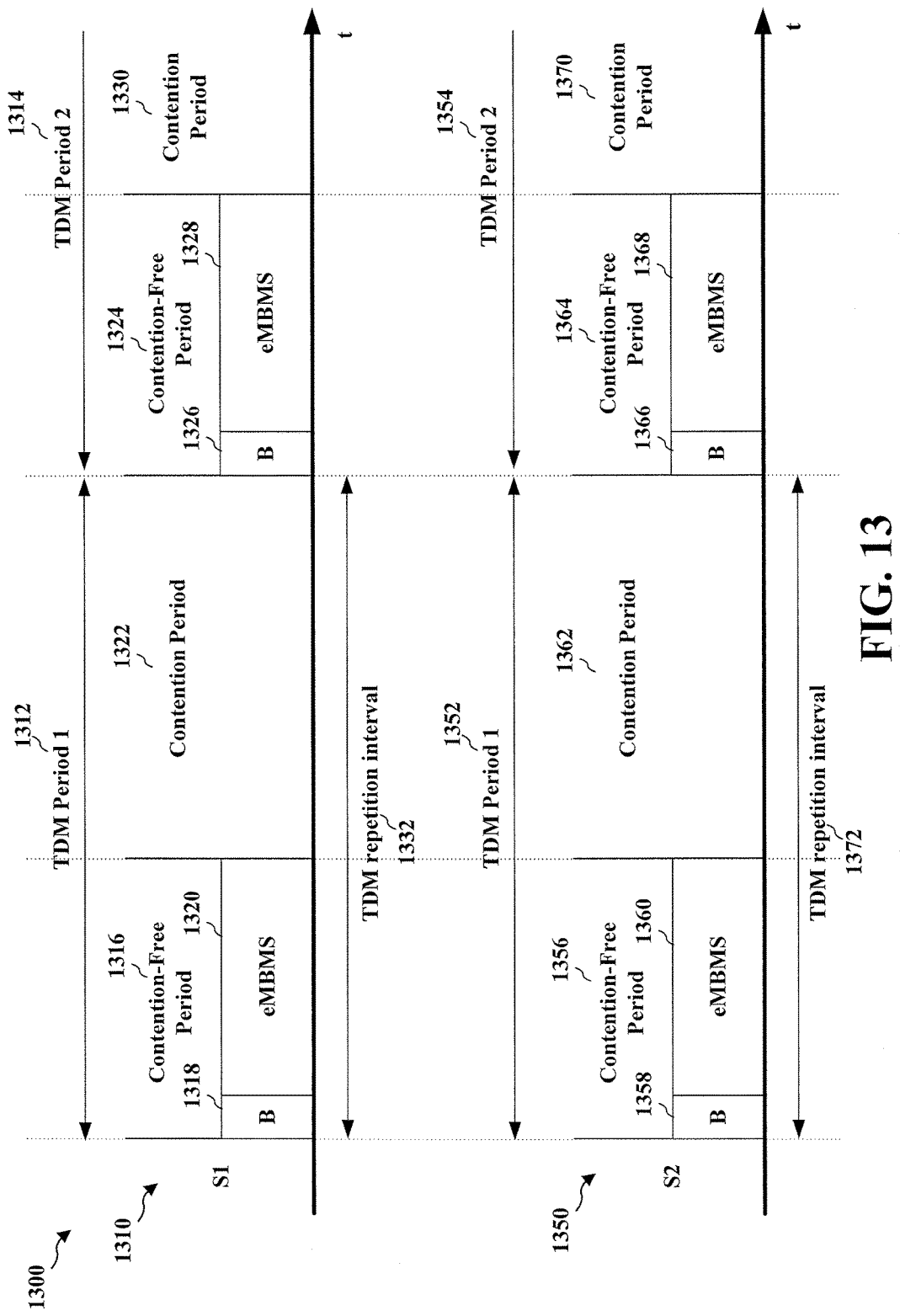
FIG. 13 illustrates example time diagrams of the TDM periods of two eNB sites according to an approach of the second aspect.

In another aspect, all eNBs utilizing the unlicensed spectrum may be synchronized in the same TDM pattern at the same channel to achieve maximum SFN gain. FIG. 13 illustrates example time diagrams 1300 of the TDM periods of two eNB sites according to the first approach of the second aspect. The first time diagram 1310 of TDM periods for a first eNB site S1 shows TDM Period 1 1312 and TDM Period 2 1314. The TDM Period 1 1312 includes a contention-free period 1316 during which a beacon signal 1318 and delay-sensitive eMBMS 1320 are transmitted and a contention period 1322 during which non-delay-sensitive eMBMS data and Wi-fi data may be transmitted. The TDM Period 2 1314 includes a contention-free period 1324 during which a beacon signal 1326 and delay-sensitive eMBMS 1328 are transmitted and a contention period 1330 during which non-delay-sensitive eMBMS data and Wi-fi data may be transmitted. The TDM Period 2 1314 may be a repeat of TDM Period 1 1312, as each TDM period may be repeated as indicated by the TDM repetition interval 1332. The second time diagram 1350 of TDM periods for a second eNB site S2 shows TDM Period 1 1352 and TDM Period 2 1354. The TDM Period 1 1352 includes a contention-free period 1356 during which a beacon signal 1358 and delay-sensitive eMBMS 1360 are transmitted and a contention period 1362 during which non-delay-sensitive eMBMS data and Wi-fi data may be transmitted. The TDM Period 2 1354 includes a contention-free period 1364 during which a beacon signal 1366 and delay-sensitive eMBMS 1368 are transmitted and a contention period 1370 during which non-delay-sensitive eMBMS data and Wi-fi data may be transmitted. The TDM Period 2 1354 may be a repeat of TDM Period 1 1352, as each TDM period may be repeated as indicated by the TDM repetition interval 1372.

As illustrated in FIG. 13, the TDM periods of the first eNB site S1 and the TDM periods of the second eNB site S2 may be synchronized to achieve maximum SFN gain. For example, the contention-free period 1316 and the contention period 1322 of TDM Period 1 1312 of the first site are synchronized with the contention-free period 1356 and the contention period 1362 of TDM Period 1 1352 of the second site, respectively, and the contention-free period 1324 and the contention period 1330 of TDM Period 2 1314 of the first site are synchronized with the contention-free period 1364 and the contention period 1370 of TDM Period 2 1354 of the second site, respectively.

In another aspect, multiple channels can adopt an approach similar to FIG. 13 to synchronize contention-free periods and contention periods within TDM periods among the multiple channels. Synchronizing multiple channels allows multiple service providers utilizing the multiple channels to provide eMBMS services in a time-synchronized manner.

Figure 14:
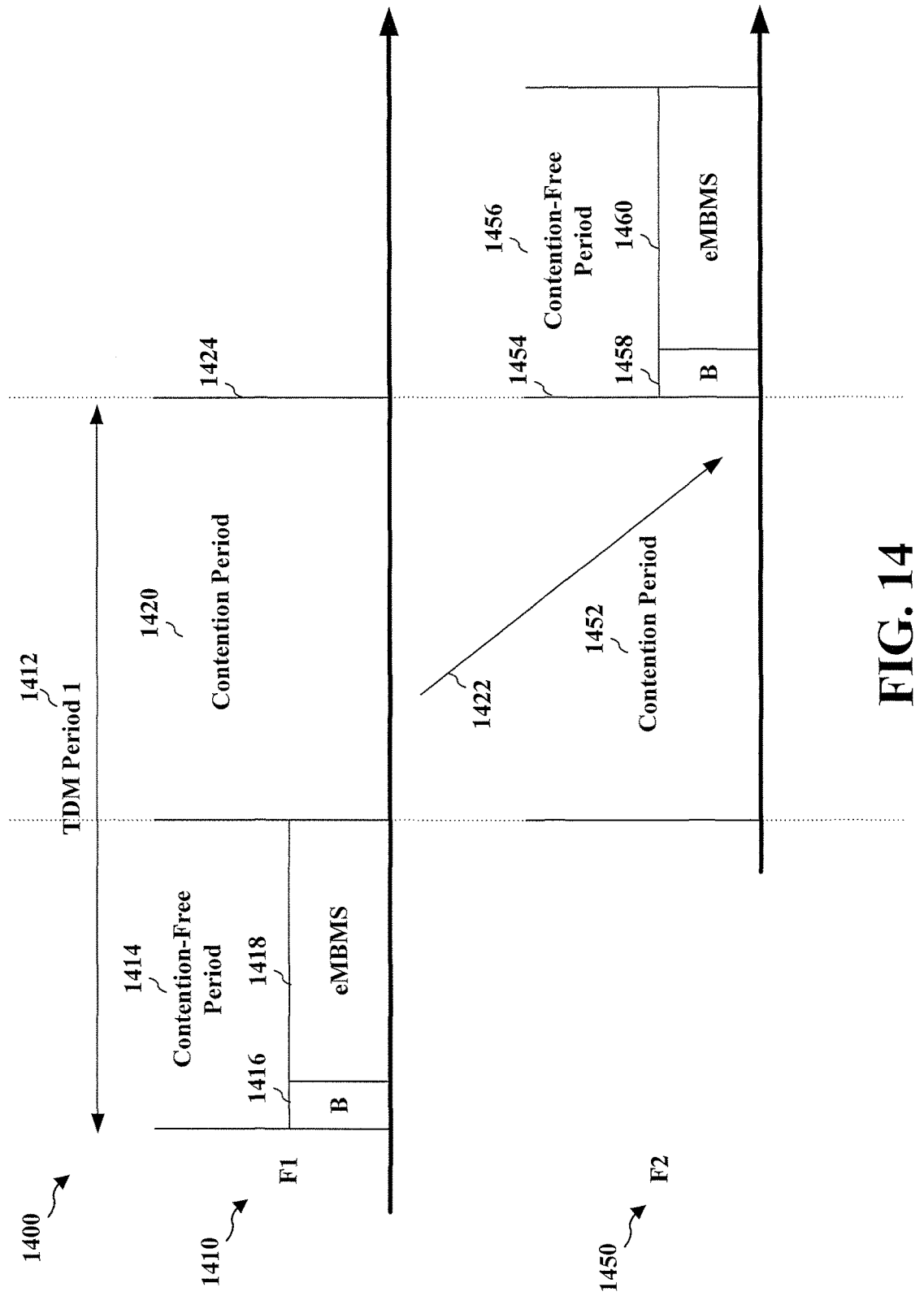
FIG. 14 illustrates example time diagrams for switching the TDM channel according to an approach of the second aspect.

In another aspect, if a Wi-fi load in the contention period of a current channel is undesirably high, the MCE may prompt the eNB to switch the current TDM channel to another channel that has a lower Wi-fi load. The synchronized TDM mode can be maintained in the new channel. That is, the contention period and/or contention-free period of the new channel is synchronized with the contention period and/or contention-free period of the previous channel. FIG. 14 illustrates example time diagrams 1400 for switching the TDM channel according to the first approach of the second aspect. A first diagram 1410 illustrates a TDM time diagram for an eNB at a channel with frequency F1. The TDM Period 1 1412 includes a contention-free period 1414 during which a beacon signal 1416 and delay-sensitive eMBMS 1418 are transmitted and a contention period 1420 during which non-delay-sensitive eMBMS data and Wi-fi data may be transmitted. If the Wi-fi load during the contention period 1420 is higher than a threshold, the MCE determines that the Wi-fi load is too high, and thus prompts the eNB to switch 1422 to another channel that is free or has a low load (e.g., below the threshold), such as a channel with frequency F2, for example. A second diagram 1450 illustrates a TDM time diagram for an eNB at the channel with frequency F2 after switching from the channel with frequency F1 to the channel with frequency F2. When the MCE prompts the eNB during the contention period 1420 to switch 1422 from the channel with frequency F1 to the channel with frequency F2, the contention period 1452 for the channel with frequency F2 may be synchronized with the contention period 1420 for the channel with frequency F1. Further, a start time 1454 of a contention-free period 1456 for the channel with frequency F2 may be synchronized with an end time 1424 of the contention period 1420 for the channel with frequency F1. It is noted that the eNB may transmit a beacon signal 1458 and eMBMS data 1460 during the contention-free period 1456 following after the contention period 1452.

Figure 15:
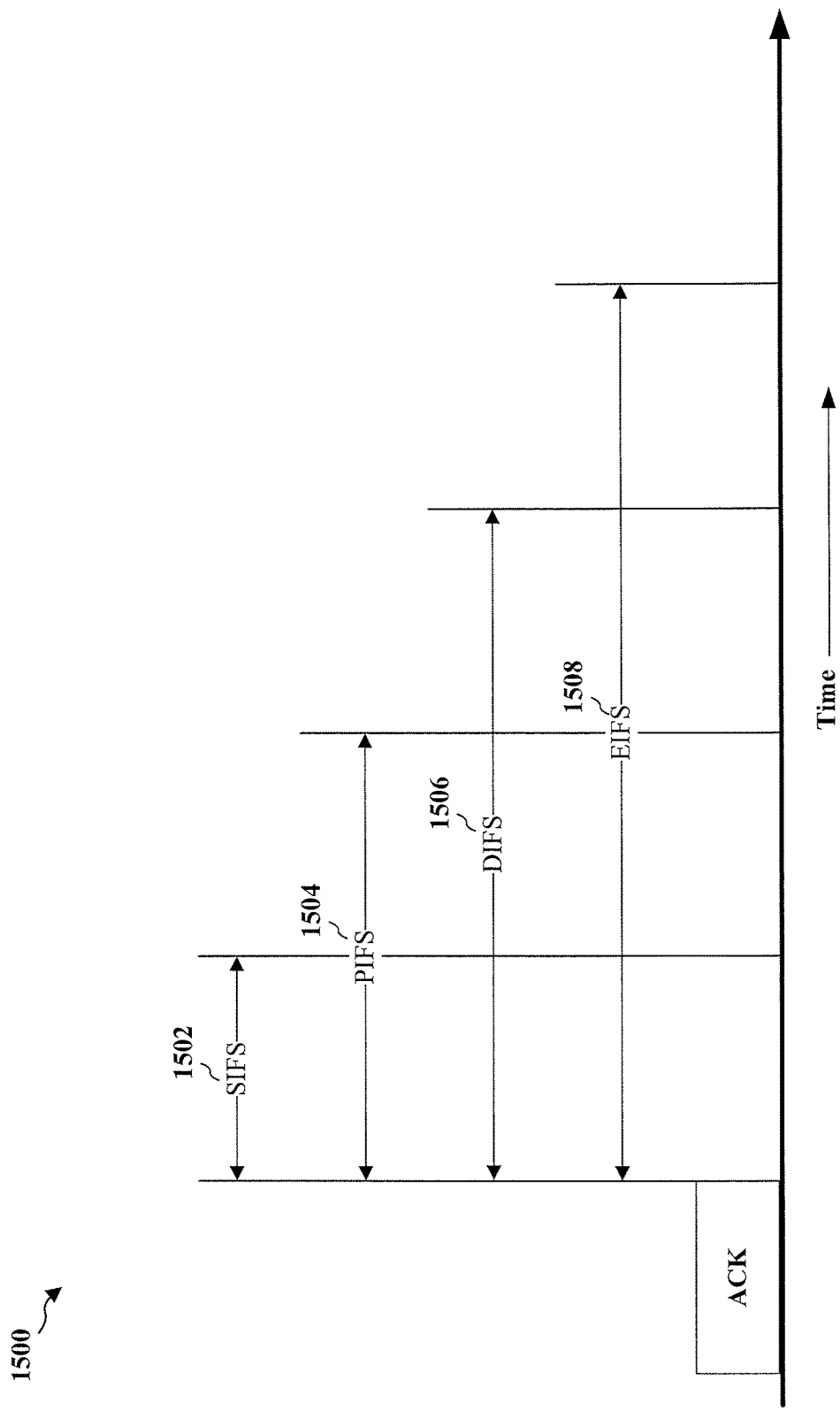
FIG. 15 is an example time diagram illustrating waiting periods corresponding to various operations after an acknowledgment at the end of Wi-fi data transmission.

In another aspect, a TDM mode contention-free period may have a higher channel access priority. TDM operation may be achieved by starting the TDM period earlier than a Wi-fi operation. In Wi-fi, an acknowledgment ACK is transmitted at the end of Wi-fi data transmission. After the ACK, a waiting period is provided to decide how the data will be transmitted for the next period. The shorter the waiting period after the ACK is, the higher the channel access priority. In order to perform a TDM operation, the TDM period may be started earlier than the Wi-fi operation by selecting an operation that corresponds to a waiting period shorter (thus having a higher channel access priority) than a waiting period for a typical Wi-fi operation. FIG. 15 is an example time diagram 1500 illustrating waiting periods corresponding to various operations after an acknowledgment at the end of Wi-fi data transmission. In the example illustrated in FIG. 15, there are five waiting periods after the acknowledgment ACK at the end of the Wi-fi transmission. The first waiting period 1502 corresponds with short interframe space (SIFS). A control frame or a next fragment may be sent after the first waiting period 1502. The second waiting period 1504 corresponds with a point coordination function interframe space (PIFS). PCF frames may be sent after the second waiting period. The third waiting period 1506 corresponds with distributed coordination function interframe space (DIFS). Distributed coordination function (DCF) frames may be sent after the third waiting period 1506. The fourth waiting period 1508 corresponds with extended interframe space (EIFS). A frame recovery after the fourth waiting period 1508 may be undesirable. Because a Wi-fi service generally has a waiting period defined as DIFS, the MCE may select a waiting period shorter or equal to a waiting period corresponding to the PIFS in order to select an interframe space with a higher priority than DIFS and to utilize the TDM.

According to a second approach of the second aspect, an eNB service utilizing an unlicensed spectrum and a Wi-fi service may co-exist using a DCF operation mode and a PCF operation mode. Wi-fi stations generally use the DCF operation mode to provide the Wi-fi service, although there may be other Wi-fi stations that use the PCF operation mode to provide the Wi-fi service. The eMBMS transmission is generally suitable for the PCF mode, but may not be suitable for the DCF mode. The TDM operation can be realized for the eMBMS transmission using the PCF operation and the DCF operation. That is, the PCF operation and the DCF operation may be adopted to provide the TDM operation. Delay-sensitive eMBMS data as well as unicast data are transmitted during a PCF operation period corresponding to a TDM contention-free period. Non-delay-sensitive data such as the Wi-fi data are transmitted during a DCF operation period corresponding to a TDM contention period. It is noted that, if a beacon used by a PCF-capable Wi-fi station is frequently detected at a current channel, the eNB reselects to a free channel and transmits eMBMS packets over the free channel.

Figure 16:
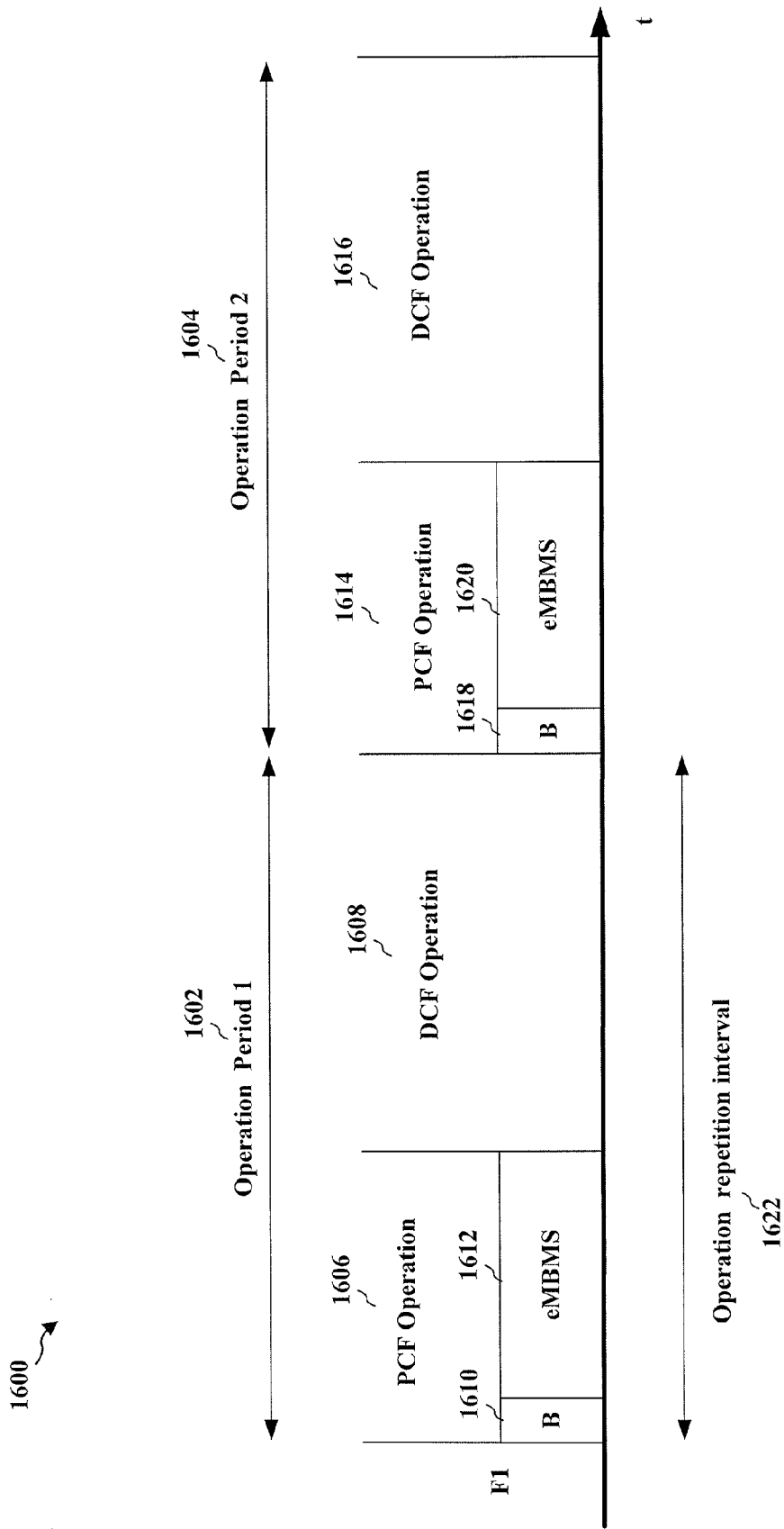
FIG. 16 is an example time diagram illustrating PCF and DCF operations according to an approach of the second aspect.

FIG. 16 is an example time diagram 1600 illustrating PCF and DCF operations according to the second approach of the second aspect. The example time diagram 1600 illustrates two operation periods for a channel corresponding to frequency F1, where the two operation periods include Operation Period 1 1602 and Operation Period 2 1604. It is noted that there may be more Operation periods before and/or after the two operation periods shown. Operation Period 1 1602 includes a PCF operation period 1606 (e.g., a contention-free period) and a DCF operation period 1608 (e.g., a contention period). During the PCF operation period 1606, the MCE prompts an eNB utilizing the unlicensed spectrum to send a beacon signal 1610 and eMBMS 1612 that are delay-sensitive. During the DCF operation period 1608, the MCE prompts an eNB utilizing the unlicensed spectrum to send eMBMS data and/or Wi-fi data that are not delay-sensitive. Operation period 2 1604 includes a PCF operation period 1614 and a DCF operation period 1616. It is noted that the operation periods may be repeated over time based on the operation repetition interval. For example, each operation period may be repeated as indicated by the operation repetition interval 1622. Therefore, Operation Period 2 1604 may be a repeat of Operation Period 1 1602, and thus the PCF operation period 1614 and the DCF operation period 1616 of Operation Period 2 may be the same as or similar to the PCF operation period 1606 and DCF operation period 1608 of Operation Period 1 1602, respectively. Thus, during the PCF operation period 1614, the MCE prompts an eNB utilizing the unlicensed spectrum to send a beacon signal 1618 and eMBMS 1620 that are delay-sensitive. During the DCF operation period 1616, the MCE prompts an eNB utilizing the unlicensed spectrum to send eMBMS data and/or Wi-fi data that are not delay-sensitive.

Figure 17:
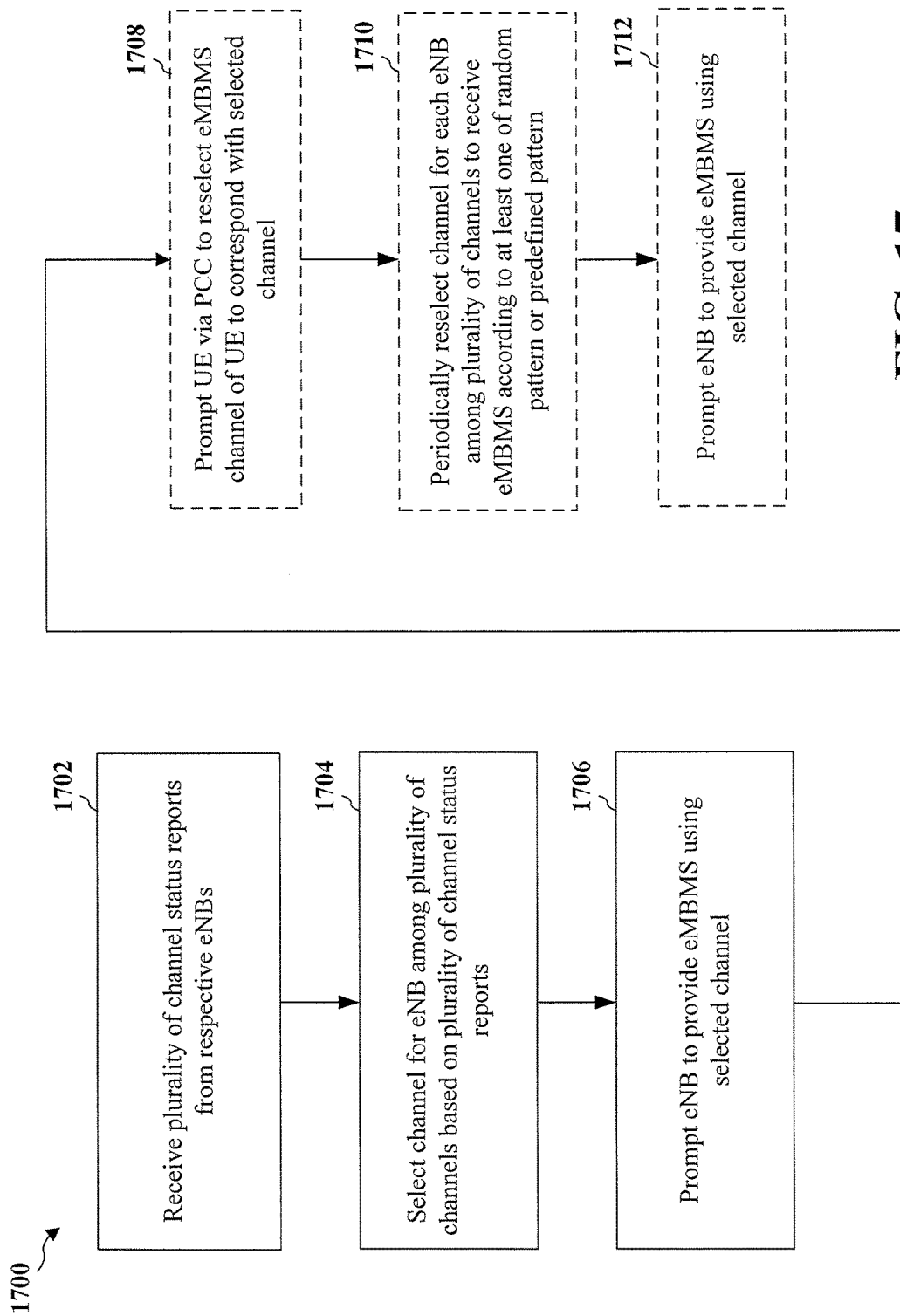
FIG. 17 is a flow chart of a method of wireless communication, according to an aspect of the disclosure.

FIG. 17 is a flow chart 1700 of a method of wireless communication, according to an aspect of the disclosure. The method may be performed by an MCE. At 1702, the MCE receives a plurality of channel status reports from respective eNBs. In an aspect, each channel status report includes channel information associated with a respective eNB for one of a plurality of channels in a contention based radio frequency band. As discussed supra, the MCE receives the channel status report from each eNB that includes information regarding whether a channel with the eNB is free or busy. In an aspect, each channel status report may include information indicating whether the channel of the respective eNB is free from a WLAN transmission. In such an aspect, the channel of the respective eNB is free from the WLAN transmission if a WLAN signal strength of the channel is less than or equal to a first threshold. As discussed supra, the channel status report may indicate that the channel is busy if the signal strength of the Wi-fi service in the channel is greater than a first threshold, and that the channel is free if the signal strength of the Wi-fi service in the channel is less than or equal to the first threshold. At 1704, the MCE selects a channel for an eNB among the plurality of channels based on the plurality of channel status reports. In an aspect, the selected channel is available to be used for an eMBMS. At 1706, the MCE prompts the eNB to provide the eMBMS using the selected channel. As discussed supra, based on the channel status reports from multiple eNBs utilizing the unlicensed spectrum, the MCE selects a free channel for each of the multiple eNBs to provide the largest possible continuous coverage and then directs each of the eNBs to switch to the corresponding free channel.

At 1708, the MCE may prompt the UE via a PCC to reselect an eMBMS channel of the UE to correspond with the selected channel. As discussed supra, after the MCE selects the channel (e.g., a free channel or a low-load channel) for each eNB, the MCE directs the UE via a PCC to reselect an eMBMS channel of the UE to correspond with the channel selected by the MCE. For example, each time the MCE selects an eMBMS channel, the MCE may direct the UE via a PCC to reselect a channel of the UE to the selected eMBMS channel.

At 1710, the MCE may periodically reselect a channel for each eNB among the plurality of channels to receive the eMBMS according to at least one of a random pattern or a predefined pattern. At 1712, the MCE may prompt the eNB to provide the eMBMS using the reselected channel. In an aspect, the reselected channel is a free channel or a low load channel. As discussed supra, for each eNB utilizing the unlicensed spectrum, the MCE may periodically reselect a free channel or a low-load channel for the eMBMS, and prompt the eNB to change the channel to the reselected channel.

In another aspect, selecting the channel at 1704 may further include selecting a free channel that is free from the WLAN transmission based on the plurality of channel status reports, and selecting a low load channel having a WLAN signal strength that is less than a second threshold if none of the respective eNBs have the free channel according to the plurality of channel status reports. In such an aspect, the MCE may further prompt a UE to receive the eMBMS via at least one of a macro eMBMS channel or a unicast channel if none of the respective eNBs have the free channel or the low load channel. As discussed supra, if the MCE determines that a free channel is not available, the MCE directs each eNB to switch to a low-load channel, where a channel is a low-load channel if a minimum Wi-fi beacon RSSI or a minimum Wi-fi response RSSI is less than a second threshold. As discussed supra, if neither a free channel nor a low-load channel exists, then the MCE may direct the UE to receive the eMBMS data via an eNB utilizing a licensed spectrum or via unicast channels.

In an aspect, the channel for the eNB may be selected to maximize as SFN gain for the eMBMS. In such an aspect, the SFN gain is maximized for the eMBMS by at least one of minimizing a number of channels used for eMBMS or maximizing a number of consecutive eMBMS sites using the same channel. In such an aspect, the MCE may select two or more of the plurality of channels to receive the eMBMS via the two or more of the plurality of channels. In such an aspect, a UE is configured to receive the eMBMS by combining data from two or more eMBMS channels of the UE corresponding with the two or more of the plurality of channels. As discussed supra, the MCE may be configured to select a channel for each eNB site so that a total number of channels used for the eMBMS is minimized and the number of consecutive eMBMS sites at each channel is maximized, in order to maximize SFN gain. As discussed supra, if multiple channels may be used for a single eNB, the MCE may direct the UE to perform carrier aggregation to combine signals (e.g., eMBMS signals) from multiple channels, in order to maximize coverage.

Figure 18:
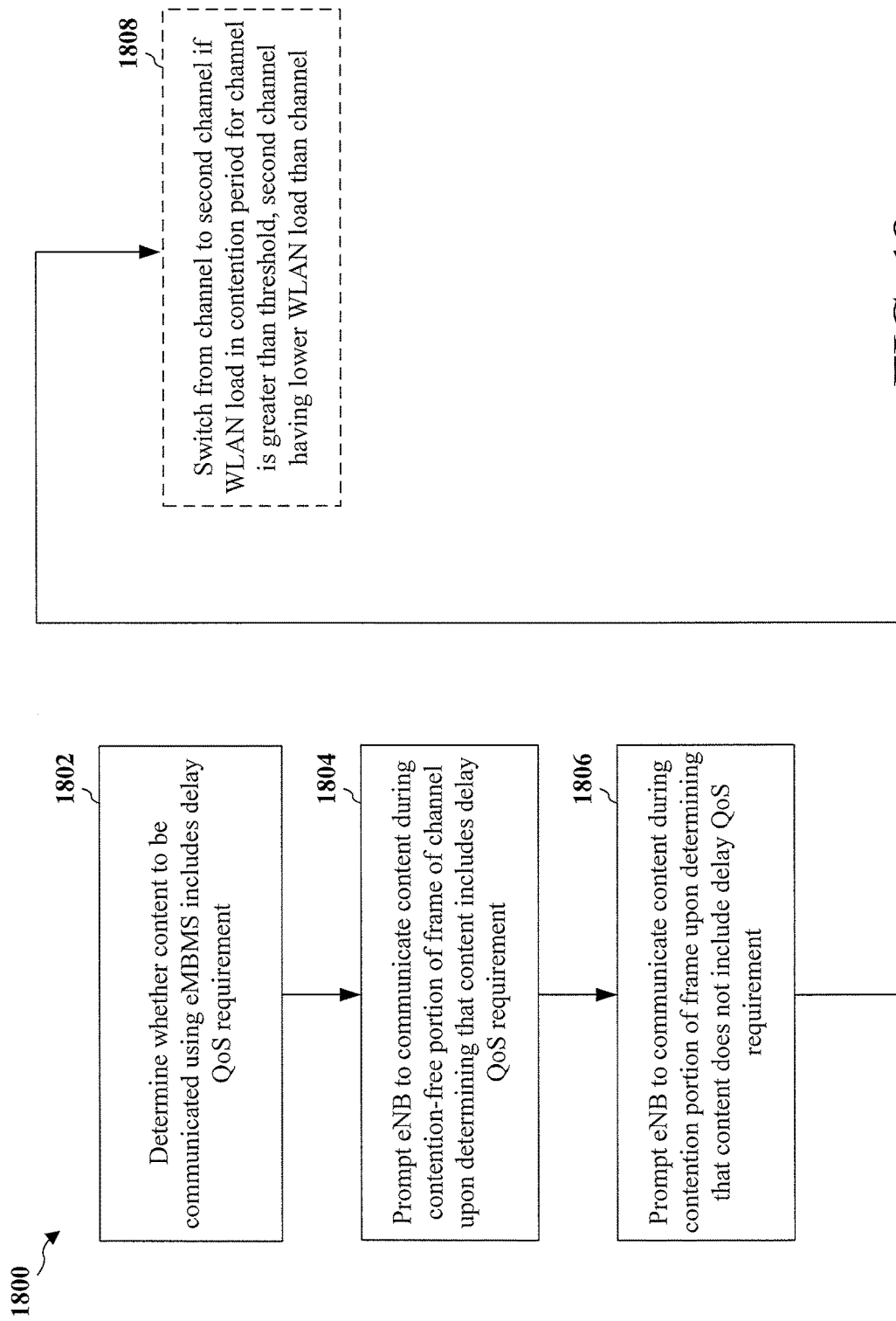
FIG. 18 is a flow chart of a method of wireless communication, according to an aspect of the disclosure.

FIG. 18 is a flow chart 1800 of a method of wireless communication, according to an aspect of the disclosure. The method may be performed by an MCE. At 1802, the MCE determines whether content to be communicated using an eMBMS includes a delay QoS requirement. In an aspect, the eMBMS is communicated within a channel in a contention based radio frequency band. At 1804, the MCE prompts an eNB to communicate the content during a contention-free portion of a frame of the channel upon determining that the content includes the delay QoS requirement. In an aspect, the channel is organized based on a TDM scheme in which the frame includes the contention-free portion and a contention portion of the frame. At 1806, the MCE prompts the eNB to communicate the content during the contention portion of the frame upon determining that the content does not include the delay QoS requirement. As discussed supra, if the MCE determines that the eMBMS data is delay-sensitive, the MCE prompts the eNB to send the delay-sensitive eMBMS data in periodical contention-free periods to satisfy the delay QoS requirement. As discussed supra, the MCE prompts the eNB to send non-delay-sensitive eMBMS data and Wi-fi data in periodical contention periods.

At 1808, the MCE may prompt the eNB to switch from the channel to a second channel if a WLAN load in the contention period for the channel is greater than a threshold, the second channel having a lower WLAN load than the channel. Referring back to FIG. 14, if the Wi-fi load during the contention period 1420 is higher than a threshold, the MCE determines that the Wi-fi load is too high, and thus prompts the eNB to switch 1422 to another channel that is free or has a low load (e.g., below the threshold), such as a channel with frequency F2.

In an aspect, the eNB and other eNBs are synchronized in the same TDM pattern at the same channel. Referring back to FIG. 13, the TDM periods of the first eNB site S1 and the TDM periods of the second eNB site S2 may be synchronized to achieve maximum SFN gain.

In another aspect, the contention-free portion of the frame of the channel is a point coordination function (PCF) contention-free portion of the frame, and the contention portion of the frame of the channel is a distributed coordination function (DCF) contention-free portion of the frame. As discussed supra, delay-sensitive eMBMS data as well as unicast data are transmitted during a PCF operation period corresponding to a TDM contention-free period, and non-delay-sensitive data such as the Wi-fi data are transmitted during a DCF operation period corresponding to a TDM contention period.

Figure 19:
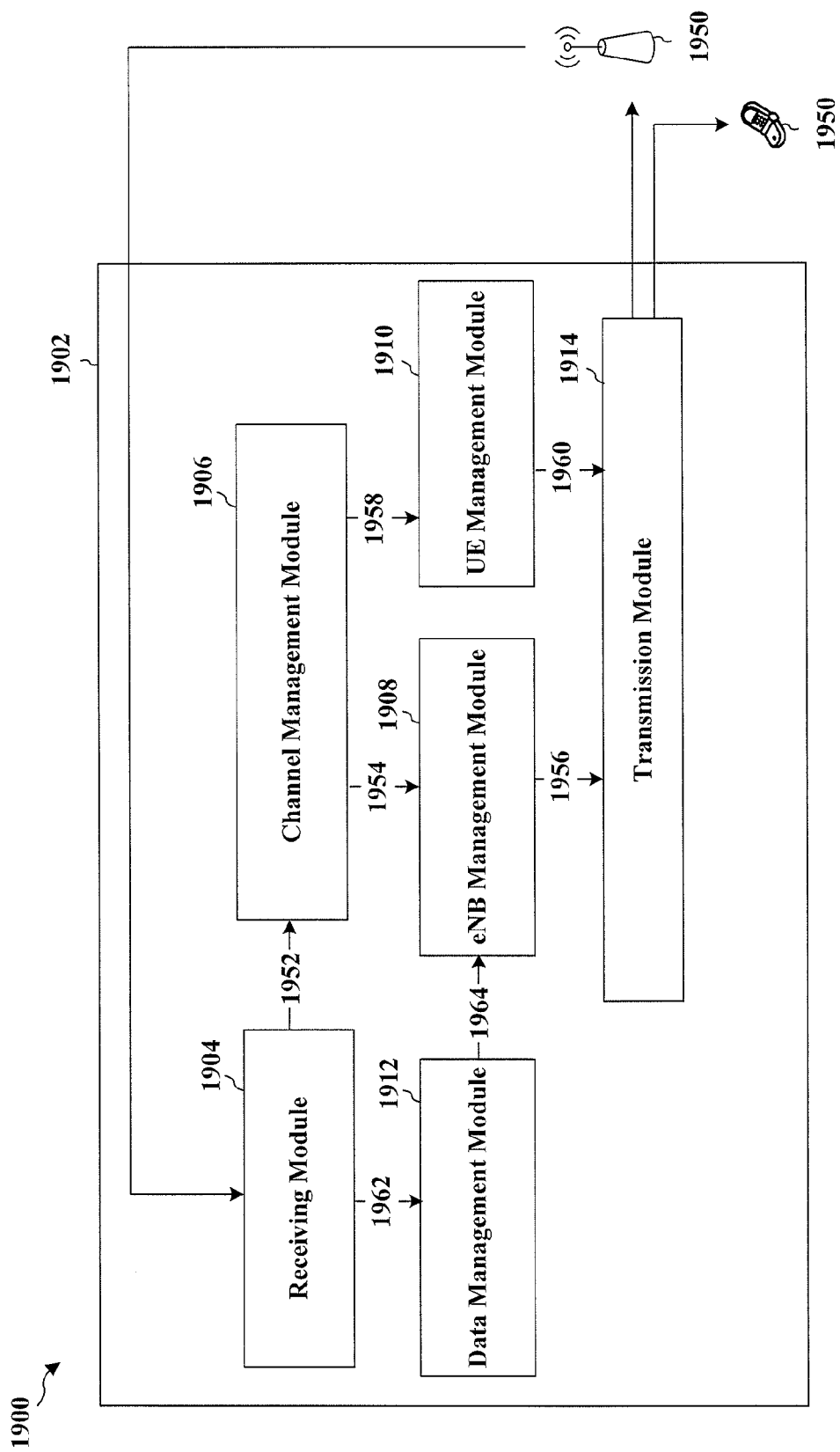
FIG. 19 is a conceptual data flow diagram illustrating the data flow between different modules/means/components in an exemplary apparatus.

FIG. 19 is a conceptual data flow diagram 1900 illustrating the data flow between different modules/means/components in an exemplary apparatus 1902. The apparatus may be an MCE. The apparatus includes a receiving module 1904, a channel management module 1906, an eNB management module 1908, a UE management module 1910, a data management module 1912, and a transmission module 1914.

According to the first aspect, the channel management module 1906 receives at 1952 (via the receiving module 1904) a plurality of channel status reports from respective eNBs 1950. In an aspect, each channel status report includes channel information associated with a respective eNB 1950 for one of a plurality of channels in a contention based radio frequency band. The channel management module 1906 selects a channel for an eNB 1950 among the plurality of channels based on the plurality of channel status reports. In an aspect, the selected channel is available to be used for an eMBMS. The eNB management module 1908 receives the selected channel at 1954 and prompts at 1956 (via the transmission module 1914) the eNB 1950 to provide the eMBMS using the selected channel.

In another aspect, each channel status report includes information indicating whether the channel of the respective eNB is free from a WLAN transmission. In such an aspect, the channel of the respective eNB is free from the WLAN transmission if a WLAN signal strength of the channel is less than or equal to a first threshold. In another aspect, when selecting the channel, the channel management module 1906 may select a free channel that is free from the WLAN transmission based on the plurality of channel status reports, and may select a low load channel having a WLAN signal strength that is less than a second threshold if none of the respective eNBs have the free channel according to the plurality of channel status reports. In such an aspect, the eNB management module 1908 may prompt at 1956 (via the transmission module 1914) a UE 1990 to receive the eMBMS via at least one of a macro eMBMS channel or a unicast channel if none of the respective eNBs 1950 have the free channel or the low load channel.

In another aspect, the UE management module 1910 may prompt at 1960 (via the transmission module 1914) a UE 1990 via a PCC to reselect an eMBMS channel of the UE 1990 to correspond with the selected channel, where the UE management module 1910 receives at 1958 the selected channel from the channel management module 1906. In another aspect, the channel for the eNB 1950 is selected to maximize an SFN gain for the eMBMS. In such an aspect, the SFN gain is maximized for the eMBMS by at least one of minimizing a number of channels used for eMBMS or maximizing a number of consecutive eMBMS sites using the same channel. In such an aspect, the channel management module 1906 may select two or more of the plurality of channels to receive the eMBMS via the two or more of the plurality of channels. In an aspect, a UE 1990 is configured to receive the eMBMS by combining data from two or more eMBMS channels of the UE 1990 corresponding with the two or more of the plurality of channels. In another aspect, the channel management module 1906 may periodically reselect a channel for each eNB 1950 among the plurality of channels to receive the eMBMS according to at least one of a random pattern or a predefined pattern, and the eNB management module 1908 may prompt at 1956 (via the transmission module 1914) the eNB 1950 to provide the eMBMS using the reselected channel. In an aspect, the reselected channel is a free channel or a low load channel.

According to the second aspect, the data management module 1906 determines whether content to be communicated using an eMBMS includes a delay QoS requirement. In an aspect, the eMBMS is communicated within a channel in a contention based radio frequency band. The data management module 1906 may receive at 1962 information regarding the content via the receiving module 1904. The eNB management module 1908 prompts at 1956 an eNB 1950 to communicate the content during a contention-free portion of a frame of the channel upon determining by the data management module 1912 at 1964 that the content includes the delay QoS requirement. In an aspect, the channel is organized based on a time division multiplexing (TDM) scheme in which the frame includes the contention-free portion and a contention portion of the frame. The eNB management module 1908 prompts at 1956 the eNB 1950 to communicate the content during the contention portion of the frame upon determining by the data management module 1912 at 1964 that the content does not include the delay QoS requirement.

In another aspect, the eNB and other eNBs are synchronized in the same TDM pattern at the same channel. In another aspect, the eNB management module 1908 prompts at 1956 (by the transmission module 1914) the eNB 1950 to switch from the channel to a second channel if the channel management module 1906 determines at 1954 that a WLAN load in the contention period for the channel is greater than a threshold, the second channel having a lower WLAN load than the channel. In another aspect, the contention-free portion of the frame of the channel is a point coordination function (PCF) contention-free portion of the frame, and the contention portion of the frame of the channel is a distributed coordination function (DCF) contention-free portion of the frame.

The apparatus may include additional modules that perform each of the steps of the algorithm in the aforementioned flow chart of FIG. 17. As such, each step in the aforementioned flow chart of FIG. 17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
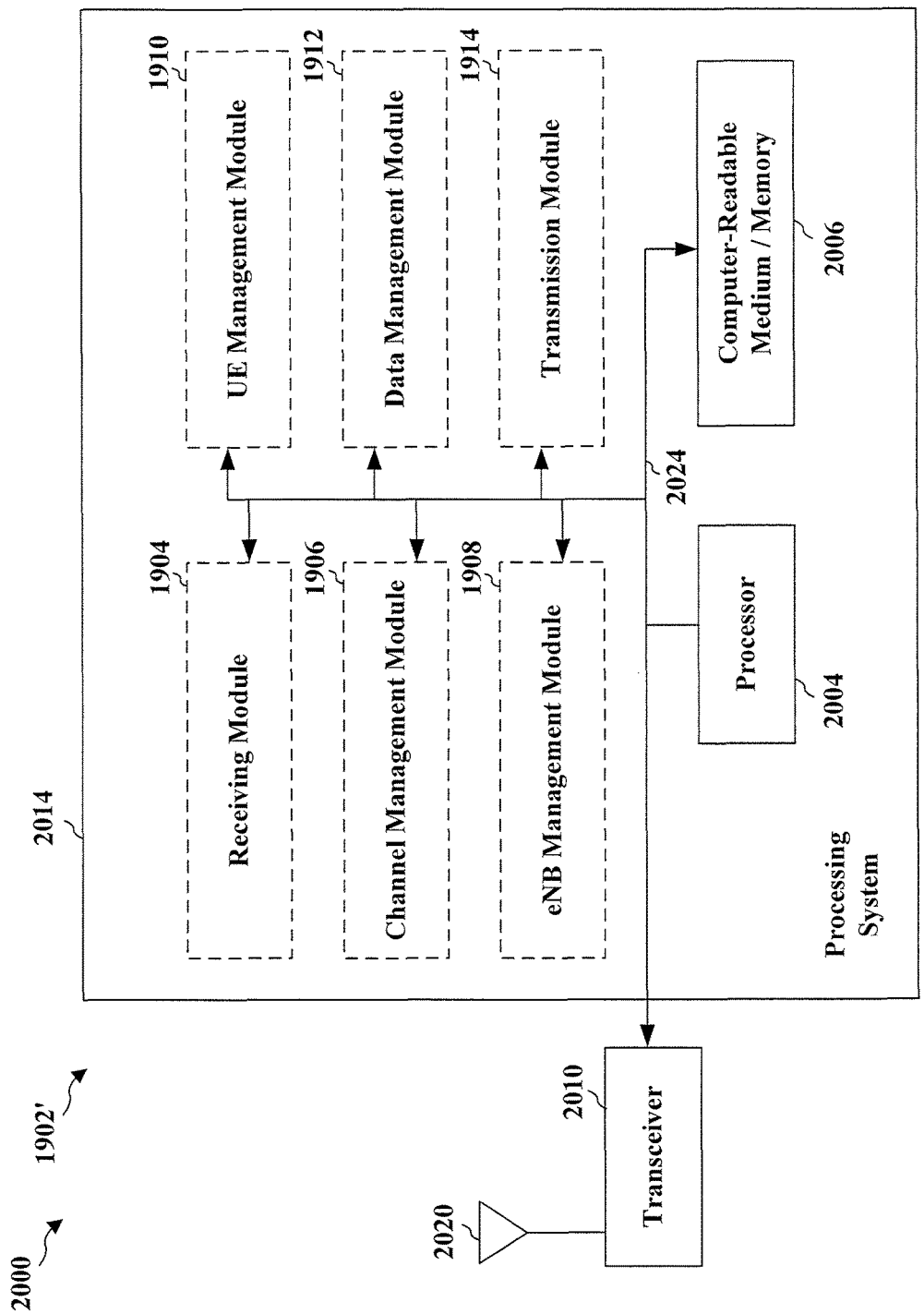
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1904, 1906, 1908, 1910, 1912, 1914 and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the receiving module 1904. In addition, the transceiver 2010 receives information from the processing system 2014, specifically the transmission module 1914, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the modules 1904, 1906, 1908, 1910, 1912, and 1914. The modules may be software modules running in the processor 2004, resident/stored in the computer readable medium/memory 2006, one or more hardware modules coupled to the processor 2004, or some combination thereof.

In one configuration, the apparatus 1902/1902' for wireless communication includes means for receiving a plurality of channel status reports from respective eNBs, means for selecting a channel for an eNB among the plurality of channels based on the plurality of channel status reports, and means for prompting the eNB to provide the eMBMS using the selected channel. The apparatus 1902/1902' may be an MCE. In an aspect, each channel status report includes channel information associated with a respective eNB for one of a plurality of channels in a contention based radio frequency band. In an aspect, the selected channel is available to be used for an eMBMS. In another aspect, each channel status report includes information indicating whether the channel of the respective eNB is free from a WLAN transmission. In such an aspect, the channel of the respective eNB is free from the WLAN transmission if a WLAN signal strength of the channel is less than or equal to a first threshold. In another aspect, the means for selecting the channel is configured to select a free channel that is free from the WLAN transmission based on the plurality of channel status reports, and select a low load channel having a WLAN signal strength that is less than a second threshold if none of the respective eNBs have the free channel according to the plurality of channel status reports. In such an aspect, the apparatus 1902/1902' further includes means for prompting a UE to receive the eMBMS via at least one of a macro eMBMS channel or a unicast channel if none of the respective eNBs have the free channel or the low load channel.

In another aspect, the apparatus 1902/1902' further includes means for prompting a UE via a PCC to reselect an eMBMS channel of the UE to correspond with the selected channel. In another aspect, the channel for the eNB is selected to maximize an SFN gain for the eMBMS. In such an aspect, the SFN gain is maximized for the eMBMS by at least one of minimizing a number of channels used for eMBMS or maximizing a number of consecutive eMBMS sites using the same channel. In such an aspect, the apparatus 1902/1902' further includes means for selecting two or more of the plurality of channels to receive the eMBMS via the two or more of the plurality of channels. In an aspect, a UE is configured to receive the eMBMS by combining data from two or more eMBMS channels of the UE corresponding with the two or more of the plurality of channels. In another aspect, the apparatus 1902/1902' further includes means for periodically reselecting a channel for each eNB among the plurality of channels to receive the eMBMS according to at least one of a random pattern or a predefined pattern, and means for prompting the eNB to provide the eMBMS using the reselected channel. In an aspect, the reselected channel is a free channel or a low load channel.

In another configuration, the apparatus 1902/1902' for wireless communication includes means for determining whether content to be communicated using an eMBMS includes a delay QoS requirement, where the eMBMS is communicated within a channel in a contention based radio frequency band, means for prompting an eNB to communicate the content during a contention-free portion of a frame of the channel upon determining that the content includes the delay QoS requirement, and means for prompting the eNB to communicate the content during the contention portion of the frame upon determining that the content does not include the delay QoS requirement. The apparatus may be an MCE. In an aspect, the channel is organized based on a TDM scheme in which the frame includes the contention-free portion and a contention portion of the frame.

In another aspect, the eNB and other eNBs are synchronized in the same TDM pattern at the same channel. In another aspect, the apparatus 1902/1902' further includes means for prompting the eNB to switch from the channel to a second channel if a WLAN load in the contention period for the channel is greater than a threshold, the second channel having a lower WLAN load than the channel. In another aspect, the contention-free portion of the frame of the channel is a PCF contention-free portion of the frame, and the contention portion of the frame of the channel is a DCF contention-free portion of the frame.

The aforementioned means may be one or more of the aforementioned modules of the apparatus 1902 and/or the processing system 2014 of the apparatus 1902' configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communications, comprising:
   receiving, by a multicast coordination entity (MCE), a plurality of channel status reports from respective eNodeBs (eNBs), wherein each channel status report includes channel information associated with a respective eNB for one of a plurality of channels in a contention based radio frequency band and information indicating whether a channel of the respective eNB is free from a wireless local area network (WLAN) transmission, wherein the channel of the respective eNB is free from the WLAN transmission if a WLAN signal strength of the channel is less than or equal to a first threshold;
   selecting the channel for an eNB among the plurality of channels based on the plurality of channel status reports, wherein the selected channel is available to be used for an evolved multimedia broadcast multicast service (eMBMS); and
   prompting the eNB to provide the eMBMS using the selected channel.

2. The method of claim 1, wherein the selecting the channel comprises:
   selecting a free channel that is free from the WLAN transmission based on the plurality of channel status reports; and
   selecting a low load channel having a WLAN signal strength that is less than a second threshold if none of the respective eNBs have the free channel according to the plurality of channel status reports.

3. The method of claim 2, further comprising:
   prompting a user equipment (UE) to receive the eMBMS via at least one of a macro eMBMS channel or a unicast channel if none of the respective eNBs have the free channel or the low load channel.

4. The method of claim 1, further comprising:
   prompting a user equipment (UE) via a primary component carrier (PCC) to reselect an eMBMS channel of the UE to correspond with the selected channel.

5. The method of claim 1, wherein the channel for the eNB is selected to maximize a single frequency network (SFN) gain for the eMBMS.

6. The method of claim 5, wherein the SFN gain is maximized for the eMBMS by at least one of minimizing a number of channels used for eMBMS or maximizing a number of consecutive eMBMS sites using the channel.

7. The method of claim 5, further comprising:
selecting two or more of the plurality of channels to receive the eMBMS via the two or more of the plurality of channels,
wherein a user equipment (UE) is configured to receive the eMBMS by combining data from two or more eMBMS channels of the UE corresponding with the two or more of the plurality of channels.

8. The method of claim 1, further comprising:
periodically reselecting a channel for each eNB among the plurality of channels to receive the eMBMS according to at least one of a random pattern or a predefined pattern; and
prompting the eNB to provide the eMBMS using the reselected channel,
wherein the reselected channel is a free channel or a low load channel.

9. An apparatus for wireless communication including a multicast coordination entity (MCE), comprising:
a memory; and
at least one processor coupled to the memory and configured to:
receive a plurality of channel status reports from respective eNodeBs (eNBs), wherein each channel status report includes channel information associated with a respective eNB for one of a plurality of channels in a contention based radio frequency band and information indicating whether a channel of the respective eNB is free from a wireless local area network (WLAN) transmission, wherein the channel of the respective eNB is free from the WLAN transmission if a WLAN signal strength of the channel is less than or equal to a first threshold;
select the channel for an eNB among the plurality of channels based on the plurality of channel status reports, wherein the selected channel is available to be used for an evolved multimedia broadcast multicast service (eMBMS); and
prompt the eNB to provide the eMBMS using the selected channel.

10. The apparatus of claim 9, wherein the at least one processor configured to select the channel is configured to:
select a free channel that is free from the WLAN transmission based on the plurality of channel status reports; and
select a low load channel having a WLAN signal strength that is less than a second threshold if none of the respective eNBs have the free channel according to the plurality of channel status reports.

11. The apparatus of claim 10, wherein the at least one processor is further configured to:
prompt a user equipment (UE) to receive the eMBMS via at least one of a macro eMBMS channel or a unicast channel if none of the respective eNBs have the free channel or the low load channel.

12. The apparatus of claim 9, wherein the at least one processor is further configured to:
prompt a user equipment (UE) via a primary component carrier (PCC) to reselect an eMBMS channel of the UE to correspond with the selected channel.

13. The apparatus of claim 9, wherein the channel for the eNB is selected to maximize a single frequency network (SFN) gain for the eMBMS.

14. The apparatus of claim 13, wherein the SFN gain is maximized for the eMBMS by at least one of minimizing a number of channels used for eMBMS or maximizing a number of consecutive eMBMS sites using the channel.

15. The apparatus of claim 13, wherein the at least one processor is further configured to:
select two or more of the plurality of channels to receive the eMBMS via the two or more of the plurality of channels,
wherein a user equipment (UE) is configured to receive the eMBMS by combining data from two or more eMBMS channels of the UE corresponding with the two or more of the plurality of channels.

16. The apparatus of claim 9, wherein the at least one processor is further configured to:
periodically reselect a channel for each eNB among the plurality of channels to receive the eMBMS according to at least one of a random pattern or a predefined pattern; and
prompt the eNB to provide the eMBMS using the reselected channel,
wherein the reselected channel is a free channel or a low load channel.

17. An apparatus for wireless communication, comprising:
means for receiving, by a multicast coordination entity (MCE), a plurality of channel status reports from respective eNodeBs (eNBs), wherein each channel status report includes channel information associated with a respective eNB for one of a plurality of channels in a contention based radio frequency band and information indicating whether a channel of the respective eNB is free from a wireless local area network (WLAN) transmission, wherein the channel of the respective eNB is free from the WLAN transmission if a WLAN signal strength of the channel is less than or equal to a first threshold;
means for selecting the channel for an eNB among the plurality of channels based on the plurality of channel status reports, wherein the selected channel is available to be used for an evolved multimedia broadcast multicast service (eMBMS); and
means for prompting the eNB to provide the eMBMS using the selected channel.

18. The apparatus of claim 17, wherein the means for selecting the channel comprises:
means for selecting a free channel that is free from the WLAN transmission based on the plurality of channel status reports; and
means for selecting a low load channel having a WLAN signal strength that is less than a second threshold if none of the respective eNBs have the free channel according to the plurality of channel status reports.

19. A non-transitory computer-readable medium storing computer executable code, comprising code for:
receiving, by a multicast coordination entity (MCE), a plurality of channel status reports from respective eNodeBs (eNBs), wherein each channel status report includes channel information associated with a respective eNB for one of a plurality of channels in a contention based radio frequency band and information indicating whether a channel of the respective eNB is free from a wireless local area network (WLAN) transmission, wherein the channel of the respective eNB is free from the WLAN transmission if a WLAN signal strength of the channel is less than or equal to a first threshold;
selecting the channel for an eNB among the plurality of channels based on the plurality of channel status reports, wherein the selected channel is available to be used for an evolved multimedia broadcast multicast service (eMBMS); and prompting the eNB to provide the eMBMS using the selected channel.

20. The non-transitory computer-readable medium of claim 19, wherein the code for selecting the channel comprises code for:

selecting a free channel that is free from the WLAN transmission based on the plurality of channel status reports; and selecting a low load channel having a WLAN signal strength that is less than a second threshold if none of the respective eNBs have the free channel according to the plurality of channel status reports.

* * * * *